US009883138B2

(12) United States Patent
Chen et al.

(10) Patent No.: US 9,883,138 B2
(45) Date of Patent: Jan. 30, 2018

(54) TELEPRESENCE EXPERIENCE

(71) Applicant: Microsoft Corporation, Redmond, WA (US)

(72) Inventors: Yinpeng Chen, Sammamish, WA (US); Philip A. Chou, Bellevue, WA (US); Zhengyou Zhang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 86 days.

(21) Appl. No.: 14/333,437

(22) Filed: Jul. 16, 2014

(65) Prior Publication Data
US 2015/0244976 A1 Aug. 27, 2015

Related U.S. Application Data

(60) Provisional application No. 61/944,910, filed on Feb. 26, 2014.

(51) Int. Cl.
*H04N 7/14* (2006.01)
*G06F 3/041* (2006.01)
*G06T 19/00* (2011.01)
*H04N 9/00* (2006.01)
*G06F 3/048* (2013.01)
(Continued)

(52) U.S. Cl.
CPC ............ *H04N 7/141* (2013.01); *G06F 3/041* (2013.01); *G06F 3/048* (2013.01); *G06T 19/006* (2013.01); *H04N 7/142* (2013.01); *H04N 7/15* (2013.01); *H04N 7/157* (2013.01); *H04N 9/00* (2013.01); *H04N 2013/0081* (2013.01)

(58) Field of Classification Search
CPC ....... G06F 3/041; G06F 3/048; G06T 19/006; H04N 7/141; H04N 7/142; H04N 7/15; H04N 7/157; H04N 2013/0081
USPC ................... 348/14.01–14.16; 370/259–271, 370/351–357; 379/202.01–207.01; 709/201–207, 217–248
See application file for complete search history.

(56) References Cited

U.S. PATENT DOCUMENTS 7,496,229 B2 2/2009 Zhang et al.
7,634,533 B2 12/2009 Rudolph et al.
(Continued)

FOREIGN PATENT DOCUMENTS

EP 2853986 A1 4/2015
WO 2010120304 A2 10/2010
WO 2013/175847 A1 11/2013

OTHER PUBLICATIONS

PCT Demand and Article 34 Amendments filed Sep. 25, 2015 to the International Search Report dated Jun. 11, 2015 from PCT Patent Application No. PCT/US2015/017003, 15 pages.
(Continued)

*Primary Examiner* — Hemant Patel
(74) *Attorney, Agent, or Firm* — Rainier Patents, P.S.

(57) ABSTRACT

The description relates to remote collaboration via a telepresence experience. One example can include an interactive digital display. The example can also include a virtual user presentation component configured to generate a graphical user interface that includes a virtual representation of a remote user on the interactive digital display. The graphical user interface can be configured to present the remote user in a side by side or mirror image relationship to a local user of the interactive digital display.

20 Claims, 14 Drawing Sheets

(51) Int. Cl.
*H04N 7/15* (2006.01)
*H04N 13/00* (2006.01)

(56) References Cited

U.S. PATENT DOCUMENTS

| | | | |
|---|---|---|---|
| 7,880,719 | B2 | 2/2011 | Kritt et al. |
| 8,390,718 | B2 | 3/2013 | Robinson et al. |
| 8,644,467 | B2 | 2/2014 | Catchpole |
| 9,030,522 | B2 | 5/2015 | Hines et al. |
| 9,049,033 | B2 | 6/2015 | Lemmey et al. |
| 2002/0158873 | A1 | 10/2002 | Williamson |
| 2005/0024484 | A1 | 2/2005 | Leonard et al. |
| 2007/0040033 | A1 | 2/2007 | Rosenberg |
| 2008/0012936 | A1 | 1/2008 | White |
| 2008/0235582 | A1 | 9/2008 | Zalewski et al. |
| 2009/0033737 | A1 | 2/2009 | Goose et al. |
| 2009/0221368 | A1 | 9/2009 | Yen et al. |
| 2010/0188478 | A1* | 7/2010 | Robinson .......... H04N 7/15 348/14.16 |
| 2010/0225735 | A1 | 9/2010 | Shaffer et al. |
| 2010/0238265 | A1 | 9/2010 | White |
| 2010/0245535 | A1 | 9/2010 | Mauchly |
| 2010/0277576 | A1 | 11/2010 | Fattal et al. |
| 2010/0302138 | A1* | 12/2010 | Poot .......... G06F 3/017 345/156 |
| 2011/0007079 | A1* | 1/2011 | Perez .......... G06F 3/011 345/473 |
| 2011/0050842 | A1 | 3/2011 | Saleh et al. |
| 2011/0096136 | A1 | 4/2011 | Liu et al. |
| 2011/0102320 | A1 | 5/2011 | Hauke et al. |
| 2011/0102539 | A1 | 5/2011 | Ferren |
| 2011/0107216 | A1 | 5/2011 | Bi |
| 2011/0202603 | A1 | 8/2011 | Mate et al. |
| 2011/0219307 | A1 | 9/2011 | Mate et al. |
| 2011/0276922 | A1 | 11/2011 | Boyd et al. |
| 2012/0038742 | A1* | 2/2012 | Robinson .......... H04N 7/142 348/14.16 |
| 2012/0044348 | A1* | 2/2012 | Pijl .......... G06T 7/0044 348/135 |
| 2012/0050458 | A1 | 3/2012 | Mauchly et al. |
| 2012/0162384 | A1* | 6/2012 | Vesely .......... G06T 19/006 348/47 |
| 2012/0176741 | A1* | 7/2012 | Wu .......... G06F 1/1601 361/679.09 |
| 2012/0229590 | A1 | 9/2012 | Barrus |
| 2012/0233553 | A1* | 9/2012 | Barrus .......... G06Q 10/10 715/751 |
| 2012/0281059 | A1 | 11/2012 | Chou et al. |
| 2012/0293487 | A1 | 11/2012 | Betzler et al. |
| 2012/0293635 | A1* | 11/2012 | Sharma .......... G06K 9/00234 348/50 |
| 2012/0307005 | A1 | 12/2012 | Suarez et al. |
| 2012/0317501 | A1 | 12/2012 | Milou |
| 2013/0016176 | A1 | 1/2013 | Hines et al. |
| 2013/0050398 | A1* | 2/2013 | Krans .......... H04N 7/142 348/14.07 |
| 2013/0063560 | A1 | 3/2013 | Roberts et al. |
| 2013/0093838 | A1 | 4/2013 | Tan et al. |
| 2013/0162749 | A1 | 6/2013 | Eskilsson |
| 2013/0201276 | A1 | 8/2013 | Pradeep et al. |
| 2014/0002586 | A1* | 1/2014 | Nourbakhsh .......... H04N 7/144 348/14.16 |
| 2014/0026064 | A1 | 1/2014 | Dawson et al. |
| 2014/0026077 | A1 | 1/2014 | Dawson et al. |
| 2014/0026078 | A1 | 1/2014 | Dawson et al. |
| 2014/0176684 | A1 | 6/2014 | Varela |
| 2014/0232816 | A1 | 8/2014 | Wilson et al. |
| 2015/0123994 | A1* | 5/2015 | Suzuki .......... G06F 3/011 345/629 |
| 2015/0288933 | A1* | 10/2015 | Iversen .......... G06F 3/147 348/14.07 |
| 2016/0205353 | A1 | 7/2016 | Wilson et al. |

OTHER PUBLICATIONS

"Highly Immersive Telepresence", Published on: Nov. 14, 2011, Available at: http://www.vtctalk.com/blog/telepresence/highly-immersive-telepresence-the-keys-to-creating-immersion.php.

Gumienny, et al., "Tele-Board in Use: Applying a Digital Whiteboard System in Different Situations and Setups", In Proceedings of Design Thinking Research Understanding Innovation, Dec. 31, 2013, 17 pages.

Leung, et al., "A Multi-User 3-D Virtual Environment with Interactive Collaboration and Shared Whiteboard Technologies", In Proceedings of Multimedia Tools and Applications, vol. 20, Issue 1, May 2003, 23 pages.

Prince, et al., "3-D Live: Real Time Interaction for Mixed Reality", In Proceeding on the ACM Conference on Computer Supported Cooperative Work, Nov. 16, 2002, 8 pages.

Apperley, et al., "Use of Video Shadow for Small Group Interaction Awareness on a Large Interactive Display Surface", In Proceedings of 4th Australasian User Interface Conference on User Interfaces, vol. 18, Feb. 2003, 10 pages.

Birnholtz, et al., "An Exploratory Study of Input Configuration and Group Process in a Negotiation Task Using a Large Display", In Proceedings of the SIGCHI Conference on Human Factors in Computing Systems, Apr. 28, 2007, 10 pages.

Brandl, et al., "Bridging the Gap between Real Printouts and Digital Whiteboard", In Proceedings of the Working Conference on Advanced Visual Interfaces, May 28, 2008, 8 pages.

Diamant, et al., "Collaborating across Cultural and Technological Boundaries: Team Culture and Information use in a Map Navigation Task", In Proceedings of International Workshop on Intercultural Collaboration, Feb. 20, 2009, 10 pages.

Dong, et al., "One Piece at a Time: Why Video-Based Communication is Better for Negotiation and Conflict Resolution", In Proceedings of the ACM conference on Computer Supported Cooperative Work, Feb. 11, 2012, 10 pages.

Doucette, et al., "Sometimes when we Touch: How arm Embodiments Change Reaching and Collaboration on Digital Tables", In Proceedings of Conference on Computer Supported Cooperative Work, Feb. 23, 2013, 10 pages.

Elrod, et al., "Liveboard: A Large Interactive Display Supporting Group Meetings, Presentations, and Remote Collaboration", In Proceedings of SIGCHI Conference on Human Factors in Computing Systems, May 3, 1992, 9 pages.

Genest, et al., "KinectArms: A Toolkit for Capturing and Displaying Arm Embodiments in Distributed Tabletop Groupware", In Proceedings of Conference on Computer Supported Cooperative Work, Feb. 23, 2013, 10 pages.

Ishii, et al., "ClearBoard: A Seamless Medium for Shared Drawing and Conversation with Eye Contact", In Proceedings of SIGCHI Conference on Human Factors in Computing Systems, May 3, 1992, 10 pages.

Jouppi, et al., "BiReality: Mutually-Immersive Telepresence", In Proceedings of 12th Annual ACM International Conference on Multimedia, Oct. 10, 2004, 8 pages.

Junuzovic, et al., "IllumiShare: Sharing Any Surface", In Proceedings of SIGCHI Conference on Human Factors in Computing Systems, May 5, 2012, 10 pages.

Kendon, Adam, "Some Functions of Gaze-Direction in Social Interaction", In Proceedings of Acta Psychologica, vol. 26, Dec. 30, 2013, 1 pages.

Khan, et al., "Spotlight: Directing Users' Attention on Large Displays", In Proceedings of SIGCHI Conference on Human Factors in Computing Systems, Apr. 2, 2005, 8 pages.

Kim, et al., "TeleHuman: Effects of 3D Perspective on Gaze and Pose Estimation with a Life-size Cylindrical Telepresence Pod", In Proceedings of SIGCHI Conference on Human Factors in Computing Systems, May 5, 2012, 10 pages.

(56) References Cited

OTHER PUBLICATIONS

Liu, et al., "Virtual View Reconstruction Using Temporal Information", In IEEE International Conference on Multimedia and Expo, Jul. 2012, 6 pages.

Misawa, et al., "LiveMask: A Telepresence Surrogate System with a Face-Shaped Screen for Supporting Nonverbal Communication", In Proceedings of International Working Conference on Advanced Visual Interfaces, May 21, 2012, 4 pages.

Moezzi, Saied, "Immersive Telepresence", In IEEE, Multimedia, vol. 4, Issue 1, Jan. 1997, 1 pages.

Morikawa, et al., "HyperMirror: Toward Pleasant-to-use Video Mediated Communication System", In Proceedings of ACM conference on Computer supported cooperative work, Nov. 14, 1998, 10 pages.

Mulligan, et al., "Stereo-Based Environment Scanning for Immersive Telepresence", In IEEE Transactions on Circuits and Systems for Video Technology, vol. 14, Issue 3, Mar. 2004, 17 pages.

Nescher, et al., "An Interactive Whiteboard for Immersive Telecollaboration", In Journal of Visual Computer: International Journal of Computer Graphics—Special Issue on CYBERWORLDS, vol. 27, Issue 4, Apr. 2011, 10 pages.

Proudlock, et al., "Coordination of Eye and Head Movements during Reading", In Proceedings of Investigative Ophthalmology & Visual Science, vol. 44, Issue 7, Jul. 2003, 8 pages.

Raskar, et al., "The Office of the Future: A Unified Approach to Image-Based Modeling and Spatially Immersive Displays", In Proceedings of 25th Annual Conference on Computer Graphics and Interactive Techniques, Jul. 19, 1998, 10 pages.

Rekimoto, Jun, "A Multiple Device Approach for Supporting Whiteboard-based Interactions", In Proceedings of the SIGCHI Conference on Human Factors in Computing Systems, Apr. 18, 1998, 8 pages.

Roussel, Nicolas, "Experiences in the Design of the Well, a Group Communication Device for Teleconviviality", In Proceedings of 10th ACM international conference on Multimedia, Dec. 1, 2002, 7 pages.

Streitz, et al., "i-LAND: An Interactive Landscape for Creativity and Innovation", In Proceedings of SIGCHI conference on Human Factors in Computing Systems, May 15, 1999, 8 pages.

Tan, et al., "ConnectBoard: A Remote Collaboration System that Supports Gaze-Aware Interaction and Sharing", In IEEE International Workshop on Multimedia Signal Processing, Oct. 5, 2009, 6 pages.

Tang, et al., "Three's Company: Understanding Communication Channels in Three-way Distributed Collaboration", In Proceedings of ACM conference on Computer supported cooperative work, Feb. 6, 2010, 10 pages.

Tang, et al., "Videowhiteboard: Video Shadows to Support Remote Collaboration", In Proceedings of SIGCHI Conference on Human Factors in Computing Systems, Apr. 1991, 8 pages.

Tseng, et al., "Immersive Whiteboards in a Networked Collaborative Environment", In IEEE International Conference on Multimedia and Expo, Aug. 22, 2001, 4 pages.

Uchihashi, et al., "Mixing Remote Locations using Shared Screen as Virtual Stage", In Proceedings of 19th ACM international conference on Multimedia, Nov. 28, 2011, 4 pages.

Zhang, et al., "Viewport: A Distributed, Immersive Teleconferencing System with Infrared Dot Pattern", In IEEE Multimedia, vol. 20, Issue 1, Jan. 2013, 11 pages.

Agamanolis et al., "Reflection of Presence: Toward more natural and responsive telecollaboration," Proceedings of SPIE Multimedia Networks, vol. 3228, Nov. 1997, 9 pages.

Bishop, Todd, "Microsoft shows off 'Holoflector' augmented-reality mirror," NBC News, retrieved at <<http://www.nbcnews.com/technology/futureoftech/microsoft-shows-holoflector-augmented-reality-mirror-244009>>, Feb. 27, 2012, 2 pages.

Butz et al., "An Experimental Hybrid User Interface for Collaboration," Technical Report No. CUCS-005-99, Columbia University, 1999, 20 pages.

Defanti et al., "Teleimmersion," Chapter 6 in the Grid: Blueprint for a New Computing Infrastructure, (Eds.) Foster et al., Morgan Kaufmann publishers, 1999, 26 pages.

Higuch et al., "ImmerseBoard: Immersive Telepresence Experience using a Digital Whiteboard," CHI '15 Proceedings of the 33rd Annual ACM Conference on Human Factors in Computing Systems, 2015, pp. 2383-2392, 10 pages.

Hosoya et al., "A Mirror Metaphor Interaction System: Touching Remote Real Objects in an Augmented Reality Environment," Proceedings of the Second IEEE and ACM International Symposium on Mixed and Augmented Reality (ISMAR L03), Oct. 7, 2003, 2 pages.

Ishii et al., "Integration of Interpersonal Space and Shared Sorkspace: ClearBoard Design and Experiments," ACM Transactions on Information Systems, vol. 11, Issue 4, Oct. 1993, pp. 349-375, 27 pages.

Morikawa et al., "HyperMirror: Toward Pleasant-to-use Video Mediated Communication System," Proceedings of the 1998 ACM Conference on Computer Supported Cooperative Work, 1998, 11 pages.

Petit et al., "Multicamera Real-Time 3D Modeling for Telepresence and Remote Collaboration," International Journal of Digital Multimedia Broadcasting, vol. 2010, May 2009, 12 pages.

Sato et al., "MR-Mirror: A Complex of Real and Virtual Mirrors," Virtual and Mixed Reality, Lecture Notes in Computer Science, Springer Berlin Heidelberg, vol. 5622, 2009, pp. 482-491, 10 pages.

Sheppard et al., "Advancing Interactive Collaborative Mediums through Tele-Immersive Dance (TED): a Symbiotic Creativity and Design Environment for Art and Computer Science," Proceedings of the 16th ACM international Conference on Multimedia, 2008, 11 pages.

Wu et al., "Towards Multi-Site Collaboration in 3D Tele-Immersive Environments," Proceedings of the 28th International Conference on Distributed Computing Systems, ICDCS '08, Jun. 2008, pp. 647-654, 8 pages.

Yang et al., "A Multi-stream Adaptation Framework for Bandwidth Management in 3D Tele-immersion," Proceedings of the 2006 International Workshop on Network and Operating Systems Support for Digital Audio and Video, Article No. 14, 2006, 3 pages.

Zillner et al., "3d-board: A whole-body remote collaborative whiteboard," Proceedings of the 27th Annual ACM Symposium on User Interface Software and Technology, UIST 2014, pp. 471-479, 9 pages.

Non-Final Office Action dated Sep. 2, 2014 from U.S. Appl. No. 13/772,252, 15 pages.

Response filed Nov. 26, 2014 to Non-Final Office Action dated Sep. 2, 2014 from U.S. Appl. No. 13/772,252, 14 pages.

Final Office Action dated Feb. 20, 2015 from U.S. Appl. No. 13/772,252, 18 pages.

Response filed May 18, 2015 to Final Office Action dated Feb. 20, 2015 from U.S. Appl. No. 13/772,252, 23 pages.

Non-Final Office Action dated Jun. 17, 2015 from U.S. Appl. No. 13/772,252, 12 pages.

International Search Report and Written Opinion dated Jun. 11, 2015 from PCT Patent Application No. PCT/US2015/017003, 10 pages.

International Search Report and Written Opinion dated Jun. 25, 2014 from PCT Patent Application No. PCT/US2014/016653, 11 pages.

Demand under Article 31 filed Oct. 16, 2014 from PCT Patent Application No. PCT/US2014/016653, 19 pages.

Second Written Opinion dated Jan. 20, 2015 from PCT Patent Application No. PCT/US2014/016653, 7 pages.

Response filed Mar. 12, 2015 to Second Written Opinion dated Jan. 20, 2015 from PCT Patent Application No. PCT/US2014/016653, 12 pages.

International Preliminary Report on Patentability dated May 26, 2015 from PCT Patent Application No. PCT/US2014/016653, 23 pages.

International Preliminary Report on Patentability dated May 9, 2016 from PCT Patent Application No. PCT/US2015/017003, 8 pages.

Response filed Dec. 17, 2015 to the Non-Final Office Action dated Jun. 17, 2015 from U.S. Appl. No. 13/772,252, 18 pages.

(56) References Cited

OTHER PUBLICATIONS

Notice of Allowance dated Feb. 1, 2016 from U.S. Appl. No. 13/772,252, 8 pages.
U.S. Appl. No. 61/944,910 titled "Telepresence Experience", filed Feb. 26, 2014 by Inventors Yinpeng Chen, Philip A. Chou and Zhengyou Zhang, 35 pages.
Second Written Opinion dated Feb. 12, 2016 from PCT Patent Application No. PCT/US2015/017003, 7 pages.
Preliminary Amendment dated Mar. 21, 2016 from U.S. Appl. No. 15/073,928, 9 pages.
Non-Final Office Action dated Sep. 1, 2016 from U.S. Appl. No. 15/073,928, 19 pages.
Response filed Oct. 14, 2016 to the Non-Final Office Action dated Sep. 1, 2016 from U.S. Appl. No. 15/073,928, 14 pages.
Final Office Action dated Oct. 27, 2016 from U.S. Appl. No. 15/073,928, 7 pages.
Terminal Disclaimer and Response filed Dec. 20, 2016 to the Final Office Action dated Oct. 27, 2016 from U.S. Appl. No. 15/073,928, 12 pages.
Response filed Mar. 28, 2017 for European Patent Application No. 15709001.0, 18 pages.
Amendment filed Mar. 8, 2017 for Chinese Patent Application No. 201580010278.X, 14 pages.

\* cited by examiner

INSTANCE ONE

INSTANCE TWO

TELEPRESENCE EXPERIENCE

BACKGROUND

When people interact in face-to-face discussions they can communicate in various ways, such as voice, gestures, eye gaze, how they orient themselves with one another, etc. Technologies exist for audio/video conferencing of remote individuals that capture voice and images, but other facets of face-to-face communication are lost. The present concepts can offer audio/video conferencing that can simulate some of these other facets to provide a more effective and rewarding user experience.

SUMMARY

The description relates to remote collaboration via a telepresence experience. One example can include an interactive digital display device. The example can also include a virtual user presentation component configured to generate a graphical user interface that includes a virtual representation of a remote user on the interactive digital display device. The graphical user interface can be configured to present the remote user in a manner that correlates the virtual representation of the remote user to interactions of the remote user on the interactive digital display device. For instance, the correlation can entail connecting an image of the remote user to the interactions. For example, this correlation can be accomplished in a side-by-side or mirror image relationship to a local user of the interactive digital display device.

The above listed example is intended to provide a quick reference to aid the reader and is not intended to define the scope of the concepts described herein.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

OVERVIEW

Figure 1:
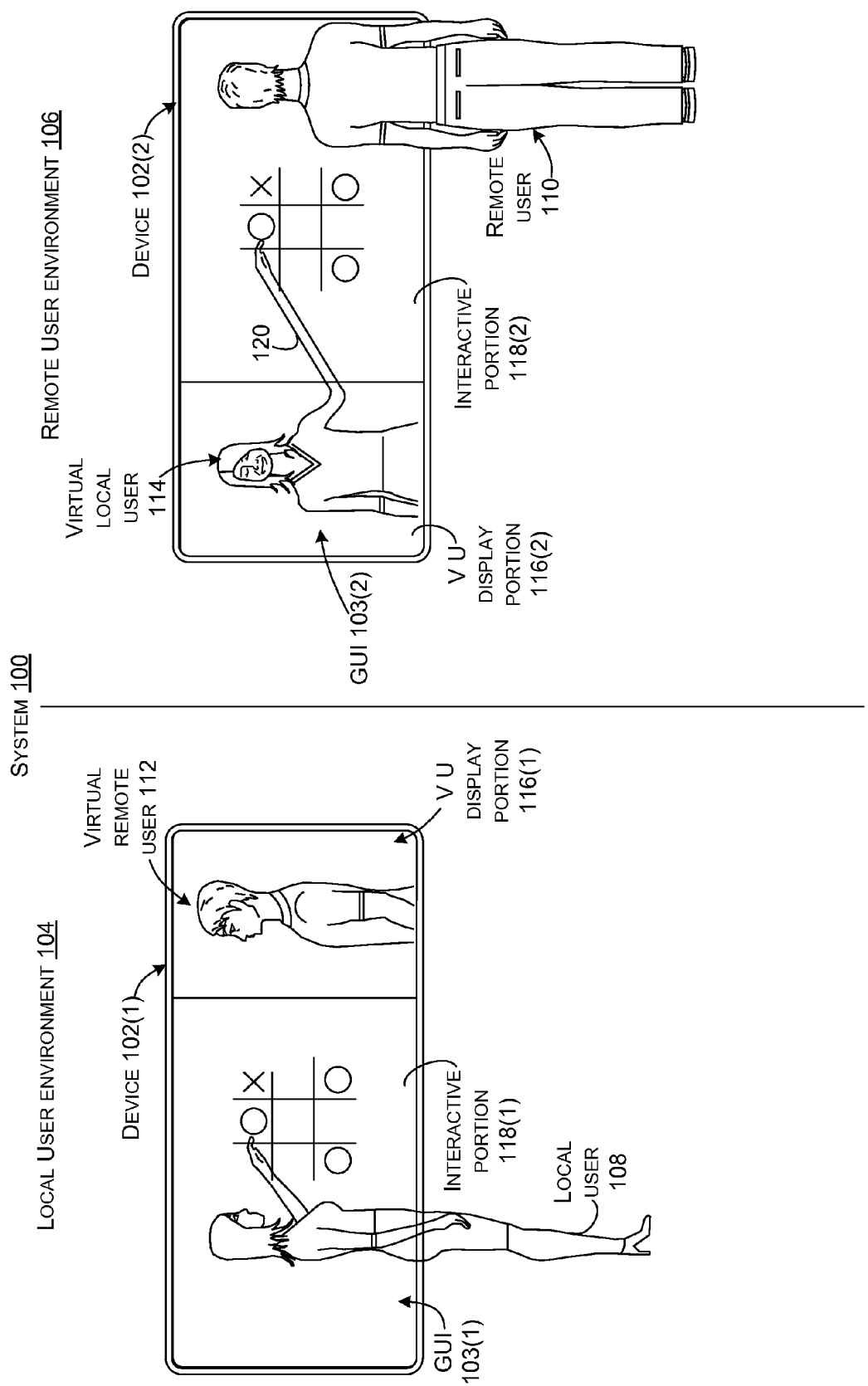
FIGS. 1-4 show example remote collaboration system scenarios in accordance with some implementations of the present concepts.

This patent relates to video conferencing that mimics real life interactions of co-located users. From one perspective the present video conferencing concepts can be termed ImmerseBoard (e.g., simulated face-to-face whiteboard collaboration). ImmerseBoard can be manifest as a system for remote collaboration through an interactive digital display device that gives participants ('users') a 3-D immersive experience. The system can combine an interactive digital display device (e.g., touch sensitive display or digital whiteboard) with a depth camera, such as the Microsoft® Kinect® sensor. Through 3-D processing of the depth images and rendering of the user's image, ImmerseBoard can emulate writing side-by-side on a physical whiteboard, or alternatively on a mirror, among others. ImmerseBoard can allow users to better estimate their remote partners' eye gaze direction, gesture direction and attention, and/or level of agreement. Moreover, these factors can translate into a heightened sense of being together and a more enjoyable telepresence experience.

A physical whiteboard can enhance collaboration between people in the same location by allowing them to share their ideas in written form. The existence of the written representations in turn can allow the users to express their relationships to the ideas in physical terms, through pointing, gaze direction, and/or other forms of gesture. These are potentially important ways, besides the written information itself, that a physical whiteboard can enhance collaboration beyond the usual important elements of collaboration between co-located people, such as eye contact, body posture, proxemics, and so forth.

When collaborators are remote, an interactive digital display device (e.g., digital whiteboard or touch sensitive display) can make it possible for remote collaborators to share their ideas graphically. Digital whiteboard sharing is a facility found in some modern video conferencing systems. However, it is used to convey information through writing. The ability for the users to relate with each other and/or with the writing through pointing, gaze, and other forms of gesture is lost. The present concepts can preserve such context, as if the users were co-located (e.g. at the same whiteboard). Thus, when viewed from one perspective the present implementations can solve the technical problem of making remote participants feel as though they are co-located around a shared whiteboard.

The present implementations can utilize immersive telepresence to preserve the remote users' physical relation to the digital whiteboard. In immersive telepresence, aspects of the remote environments can be captured, transmitted, and shared, so that users can view and hear each other (potentially life-sized) with the proper perspective in a large field of view, as if they were in the same location. The remote users and parts of their environments can be captured in 3-D and blended into a common 3-D virtual environment, in which the users may interact. Users can also manipulate shared content.

Implementations of the present concepts can create an immersive experience around remote digital whiteboard collaboration. Three of these immersive conditions, called hybrid, mirror, and tilt board conditions, are shown in FIGS. 1-2, 3, and 4, respectively. Details for accomplishing these conditions are described subsequently relative to FIGS. 10-13.

User Experience Examples

Figure 2:
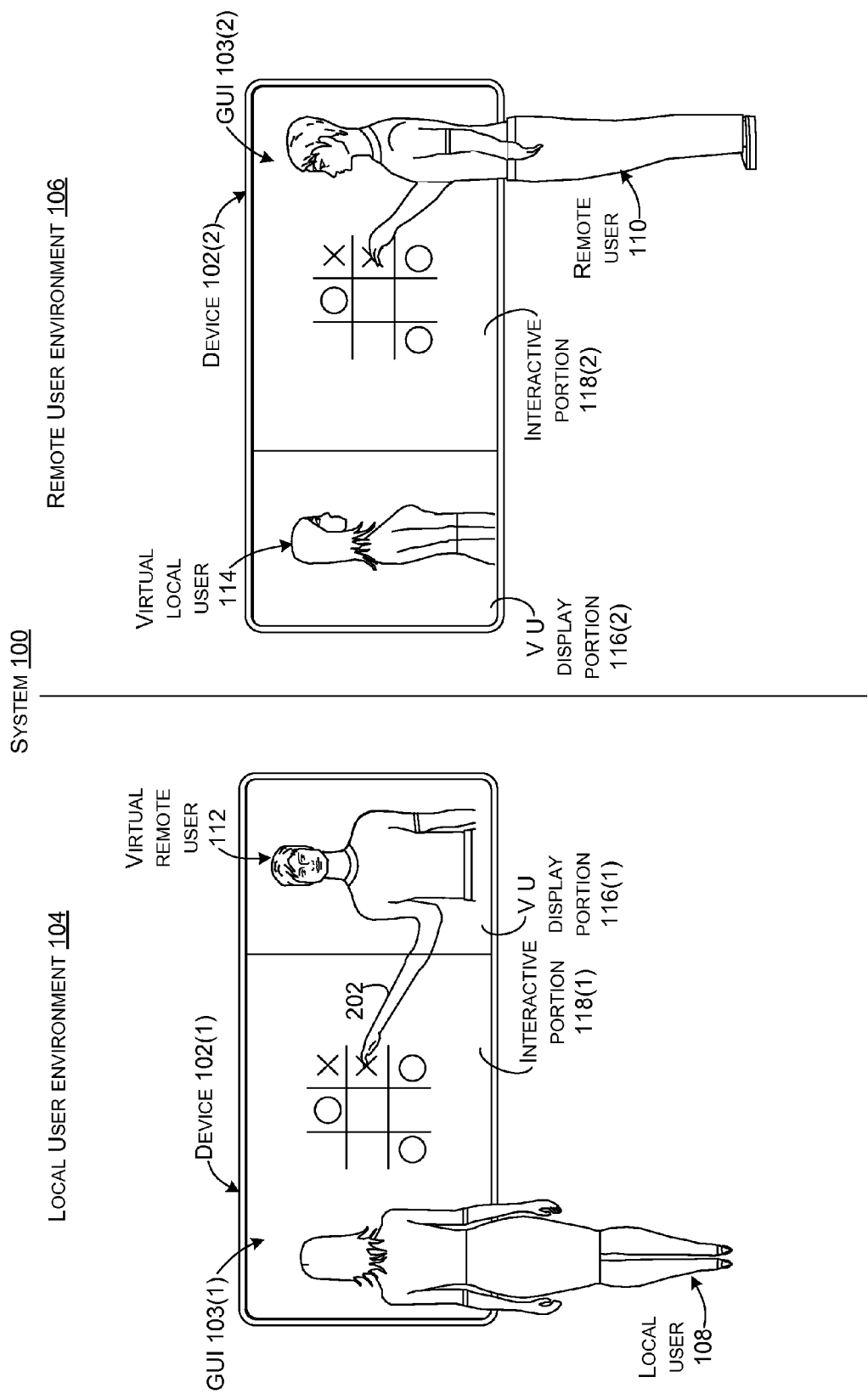

FIGS. 1-2 show an example of the hybrid condition ImmerseBoard mentioned above accomplished on a system 100. System 100 can include first and second interactive digital display device ('devices') 102(1) and 102(2). A graphical user interface (GUI) 103 can be presented on the devices 102. System 100 can be divided into a local user environment 104 (e.g., first user environment) and a remote user environment 106 (e.g., second user environment). A local user 108 (e.g., first user) can be present in the local user environment 104 while a remote user 110 (e.g., second user) can be present in the remote user environment 106. A virtual representation of remote user 110 (e.g., virtual remote user) 112 can be captured in the remote user environment and presented on device 102(1). Similarly, a virtual representation of local user 108 (e.g., virtual local user) 114 can be captured in the local user environment and presented on device 102(2). Note that 'local' and 'remote' are arbitrary and could simply be 'first' and 'second.' Thus, what is local to the first user is remote to the second user and what is local to the second user is remote to the first user.

In this implementation, a virtual user display portion of the device 102 that is not directly in front of the 'local' user is utilized to present the virtual user. For instance, virtual remote user 112 is presented in virtual user display portion 116(1) that is to the right of the local user 108. Similarly, virtual local user 114 is presented on virtual user display portion 116(2) that is to the left of remote user 110.

A separate interactive portion 118 (e.g., virtual drawing surface) of the GUI 103 can be used for writing, drawing etc. Thus, GUI 103 can include the virtual user display portion 116 and the interactive portion 118. For instance, GUI 103(1) can include virtual user display portion 116(1) and interactive portion 118(1) and GUI 103(2) can include virtual user display portion 116(2) and interactive portion 118(2).

Note further, that while the representation of the local user is presented in the virtual user display portion 116(2), user movements relative to the device can be correlated between the virtual user display portion 116(2) and the interactive portion 118(2). In this example the correlation can entail 'stretching' a representation of the user's arm from the virtual user display portion 116(2) to the interactive portion 118(2). For instance, in the illustrated example, local user 108 is pointing at an "0" in the interactive portion 118(1) of device 102(1). Her action can be mimicked on device 102(2) by presenting her hand pointing at the corresponding "0" in interactive portion 118(2) of device 102(2) and 'stretching' her arm from her image (e.g., virtual local user 114) in the virtual user display portion 116(2) to her hand as indicated at 120. Thus, her action is readily visually conveyed to the remote user 110 in a manner that mimics a face-to-face interaction where she could reach out and point at the "0".

To summarize, FIG. 1 shows a user command performed by the local user 108 relative to the device 102(1) and how the user command is presented in the remote user environment 106.

FIG. 2 shows a user command performed by the remote user 110 and how the user command is presented in the local user environment 104. In this example, the remote user 110 performs a user command by digitally writing an "X" on the interactive portion 118(2) of the device 102(2) with his finger (or alternatively a digital pen). In the local user environment 104, a representation of the remote user's hand is shown writing the "X" at a corresponding location on the interactive portion 118(1). The representation of the remote user's hand can be connected to the virtual remote user 112 by 'stretching' the remote user's arm at 202 from the virtual user display portion 116(1) to the representation of the remote user's hand in the interactive portion 118(1). Note that while the 'stretched' arm is used to correlate the user's image to the content, other visual representation techniques can also be used. For instance, an arrow could connect the user to the content, or a 'light beam' could be directed along the surface from the user's image to the content, among other correlation techniques. Thus, the light beam or the arrow, among others, can be used as a symbolic representation of the user's arm as opposed to a life-like representation of the user arm.

In the above scenarios, each user can see what the other user is doing, see their posture, see their relative position, and/or see their interactions with the device.

To summarize, from one perspective the hybrid condition depicted in system 100 can be characterized as a modification of 2-D video conferencing with a whiteboard, extending a remote person's hand out of the video window (e.g., virtual user display portion) to reach a location where he or she is pointing or writing. This is illustrated in FIGS. 1 and 2 which are divided into a local user environment and a remote user environment of system 100.

Figure 3:
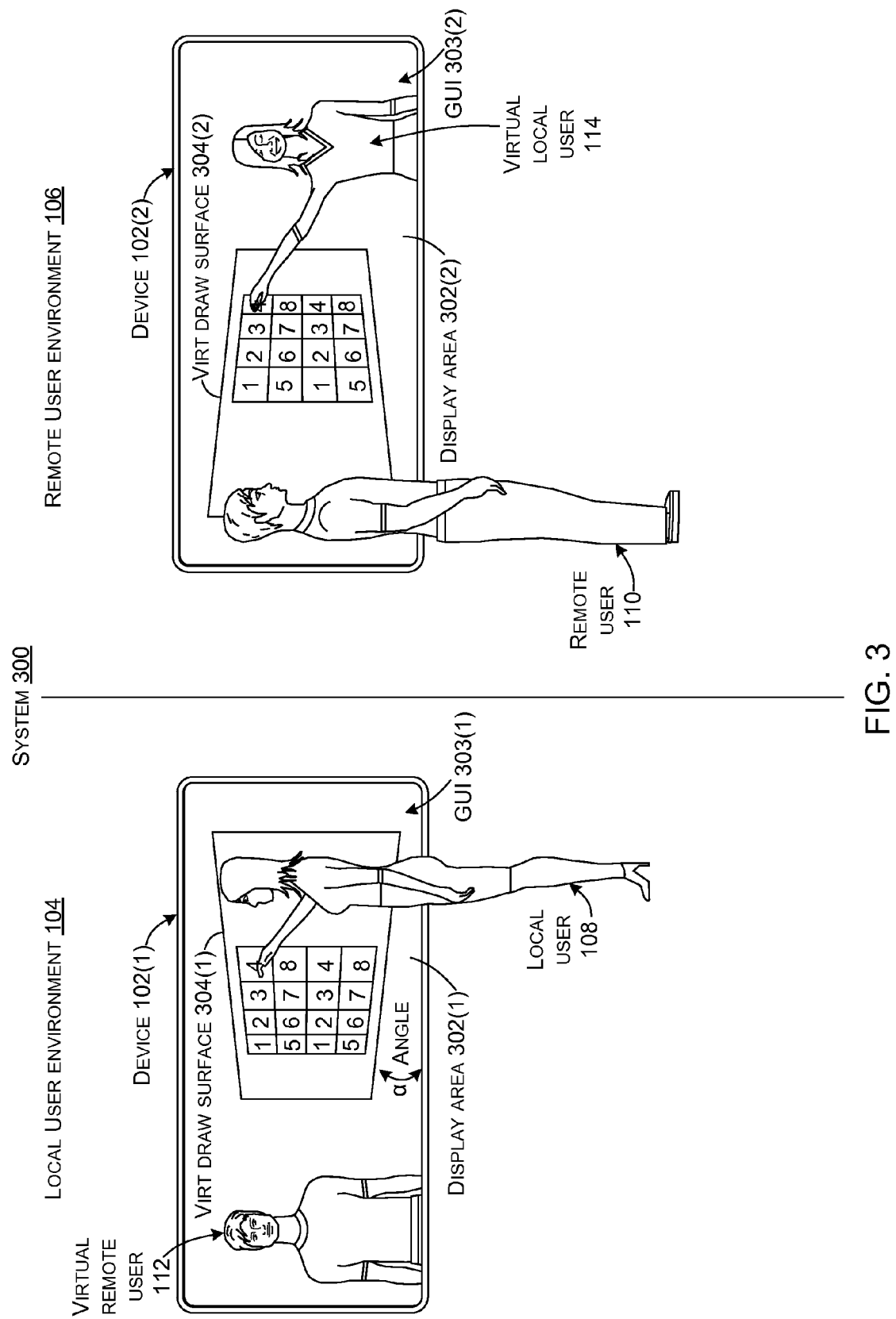

FIG. 3 shows an example tilt board ImmerseBoard implementation on a system 300. Briefly, from one perspective, the tilt board can emulate side-by-side collaboration while writing on a physical whiteboard.

In this case, display areas 302 of respective devices 102 are designated. A graphical user interface (GUI) 303 can be presented on the display area 302 that includes a virtual drawing surface 304 that can be presented on the display area 302. A virtual representation of the other user can be presented on the display area 302 outside of the virtual drawing surface 304. For instance, relative to the local user environment 104, virtual remote user 112 is presented and relative to the remote user environment 106, a virtual local user 114 is presented. In this particular implementation, the virtual drawing surface 304 is generally rectangular, but such need not be the case. As with some of the other described conditions, in some implementations, the full upper body of the virtual users (e.g., virtual remote user 112 and virtual local user 114) can be seen life-sized, conveying body posture, body proximity, gesture direction, pointing direction, and eye gaze direction, in relation both to the device 102 and to the other user. However, to fit the virtual user's image on the device, the image of the rectangular drawing surface can be tilted back at an angle α, such as 10 to 45 degrees, and rendered in perspective. That is, the drawing surface is now virtual; hence the term virtual drawing surface. The users are able to write on the virtual drawing surface 304, by writing onto its projection as part of the GUI 303. At the same time, the users can see each other as if they were side by side.

Some implementations can avoid the user writing on the angled or tilted virtual drawing surface 304 by temporarily rectifying the virtual drawing surface in line with the display area 302 if a writing gesture is detected or predicted. Alternatively this option could be offered to the users' for manual implementation when they want to write. In manual mode, the user can select (e.g., push a button or perform a control gesture) to toggle between tilted and rectified virtual drawing surfaces. In auto mode, when the user's hand comes close to the digital whiteboard, the board can be automatically rectified. When the user withdraws their hand and/or steps away from the device, the virtual drawing surface tilts back in perspective. In either case, in some implementations when the virtual drawing surface is rectified, the remote user is no longer visible, though such need not be the case. Thus, typically, a user will use the tilted board to watch the remote user present, and will use the rectified board to write detailed sketches. The tilting and rectification are visualizations for the benefit of the local user only, and can be done independently on either side.

Figure 4:
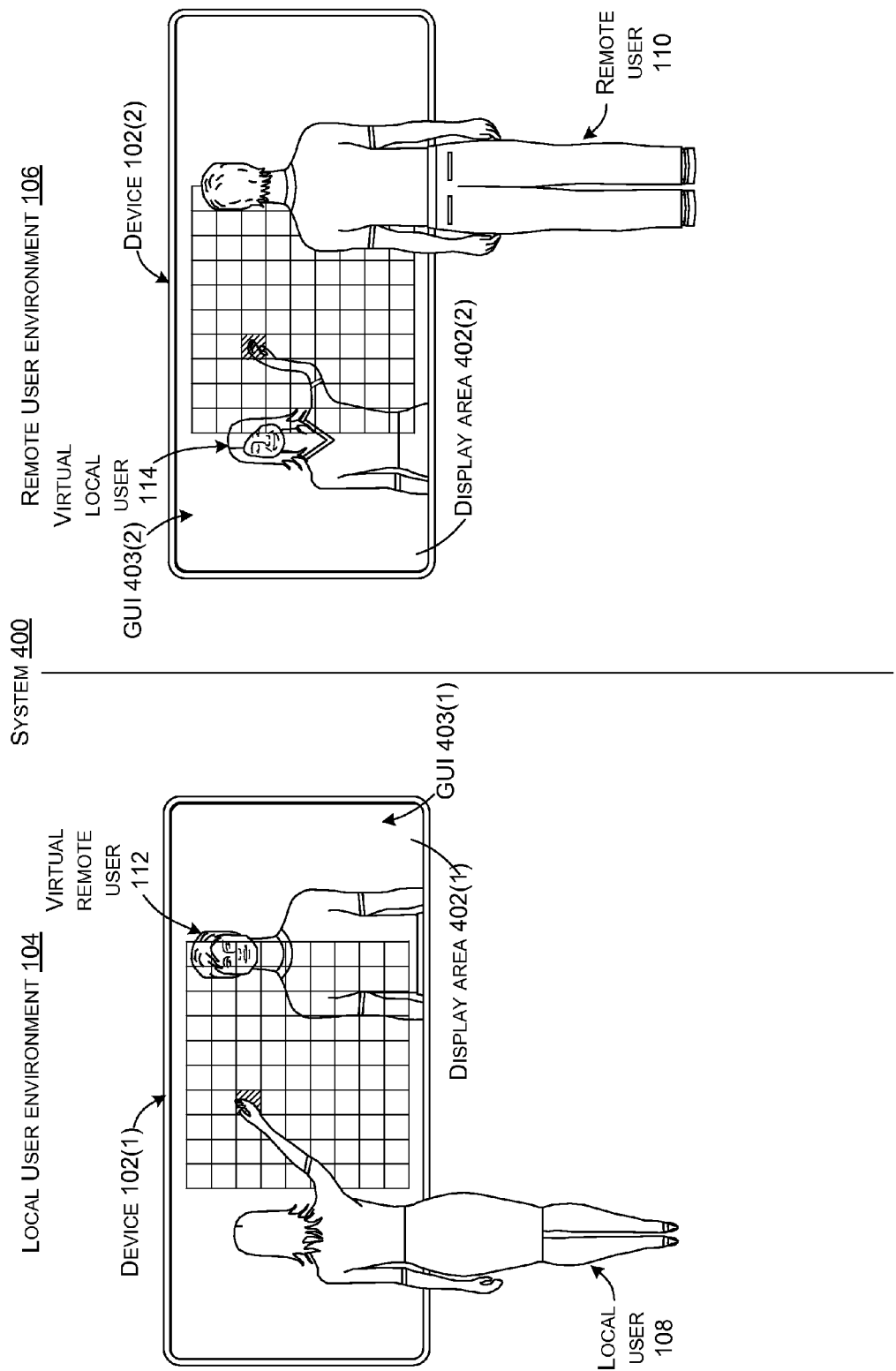

FIG. 4 shows an example of the mirror condition ImmerseBoard implemented by system 400. From one perspective, the mirror condition can emulate side-by-side collaboration while writing on a physical mirror (e.g., a mirror image relationship).

The mirror condition, shown in FIG. 4, can be thought of as an emulation of the mirror metaphor. In this implementation, a portion of each virtual user's body (such as their upper body) can be presented life-sized, conveying body posture, body proximity, gesture direction, pointing direction, and eye gaze direction, in relation both to the device 102 and to the local user (e.g., other user). Both users are able to write on the entire display area 402 of GUI 403, and see each other in any part of the display area, as if it were a large mirror.

Figure 10:
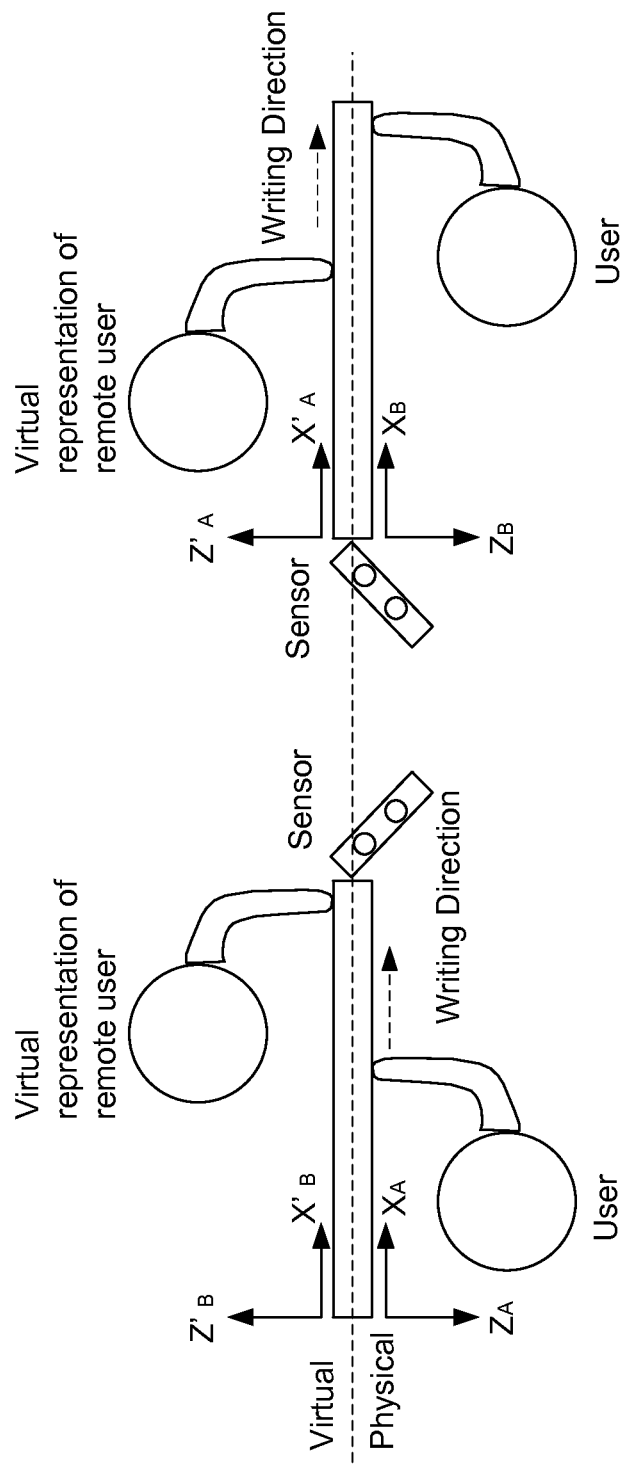

At first glance the mirror condition may seem equivalent to viewing each other through a glass wall, but that metaphor is incorrect. If one person writes characters on a glass wall, the other person sees the characters written in reverse. A mirror is the correct metaphor, because users are on the same side of the writing surface and hence share the same left/right geometry. Previous remote collaboration systems that allow users to face each other through a clear board flip the 2-D video to solve the writing problem. The present mirror visualization flips only depth, leaving writing in the correct left/right direction, as shown in FIG. 10.

FIGS. 1-4 offer three ImmerseBoard implementations. Note that the implementations can serve to virtually connect the display area of the board and the other user. Each user can see what the other user is doing relative to the digital whiteboard and can see where they are looking, their face, expression, eye gaze direction, etc. Thus, rather than seeing the other person's face on one part of the digital whiteboard and then seeing content suddenly appear on another part of the board, the user can see the other user's body writing on the board and the content that they write on the board as well as their face while they are writing.

Effective remote collaboration often entails content sharing (e.g. documents or writing) and natural communication (e.g. voice, gesture, and/or eye contact). This section describes some of the design principles underlying ImmerseBoard to achieve immersive remote whiteboard collaboration.

Eye contact and facial expression can be crucial social tools used by people for collaboration. However, existing video conferencing systems cannot accurately convey eye gaze awareness because the camera is not positioned at the remote person's eye image. This makes remote communication less effective because of poor understanding of each other's attention. The present implementations can support realistic eye contact.

Attention awareness is often important for remote collaboration since it is helpful for understanding the remote user's interest and context. Particularly for whiteboard collaboration, users usually pay attention to the collaborator's talking or the content on the board through voice, looking, writing, touching, or finger pointing. Therefore, some of the present implementations can communicate an accurate three-way geometric relationship between remote user, whiteboard, and local user, especially for the eye gaze direction and hand position.

The remote collaboration could be more effective if the remote user's action (e.g. drawing, pointing, selecting) can be predicted accurately. Similar to the attention awareness, this also can entail a collaboration system to capture and faithfully render the remote user's information whenever possible. This can include life-sized representation of remote user(s) on the whiteboard and accurate presentation of the geometric relationship of the remote user with the whiteboard.

Figure 7:
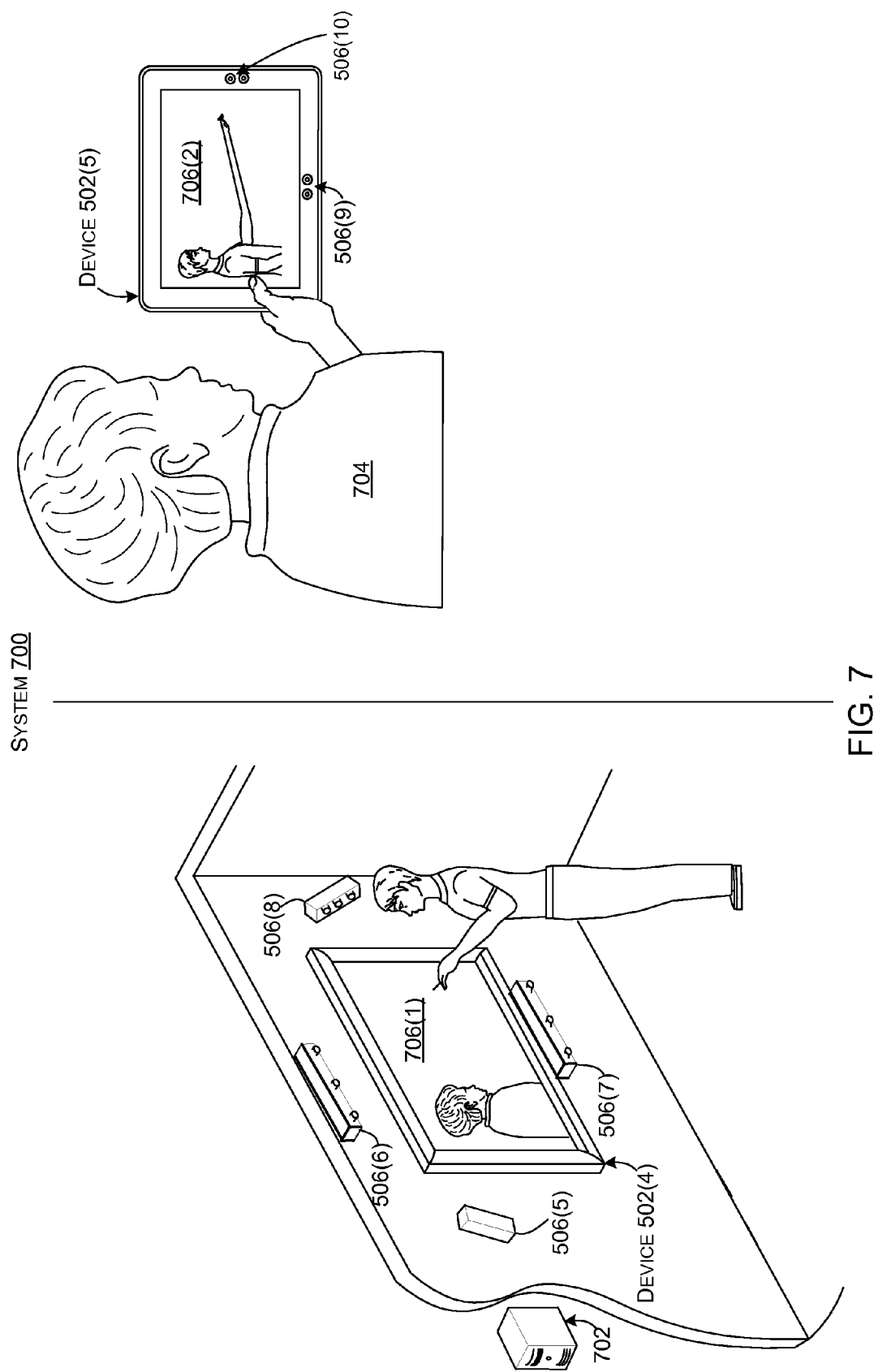

Other implementations are contemplated for achieving these features relative to digital whiteboards. For instance, for ease of illustration, the form factors of devices 102 in FIGS. 1-4 are very similar in both the local and remote environment. However, such need not be the case. For example, FIG. 7 shows an example implementation that employs a large form factor digital whiteboard and a small form factor tablet-type device. The skilled artisan should recognize still other implementations.

Also note that while only a single user is shown in the local user environment and a single user in the remote user environment, one or both of these environments could be occupied by a group of people interacting with the digital whiteboard. Further, some implementations could operate with more than two environments at once (e.g., three or more users in three or more locations interacting in an ImmerseBoard meeting).

Note further, that for sake of explanation the same hybrid configuration is shown in the local and remote environments of FIG. 1. However, the remote user might choose to use the tilted condition of FIG. 3 or mirror condition of FIG. 4 while the local user utilizes the hybrid condition. Further, a single user may switch between conditions without affecting the other user. For instance, the local user may use the hybrid condition for certain interactions and then switch to the tilted condition for others without affecting the remote user. The ability to select a condition can be performed manually. Alternatively or additionally, some implementations can perform the selection automatically, such as based upon various user preferences and/or parameters of the use, such as the frequency of writing or pointing at content on the display.

Example Systems

Figure 5:
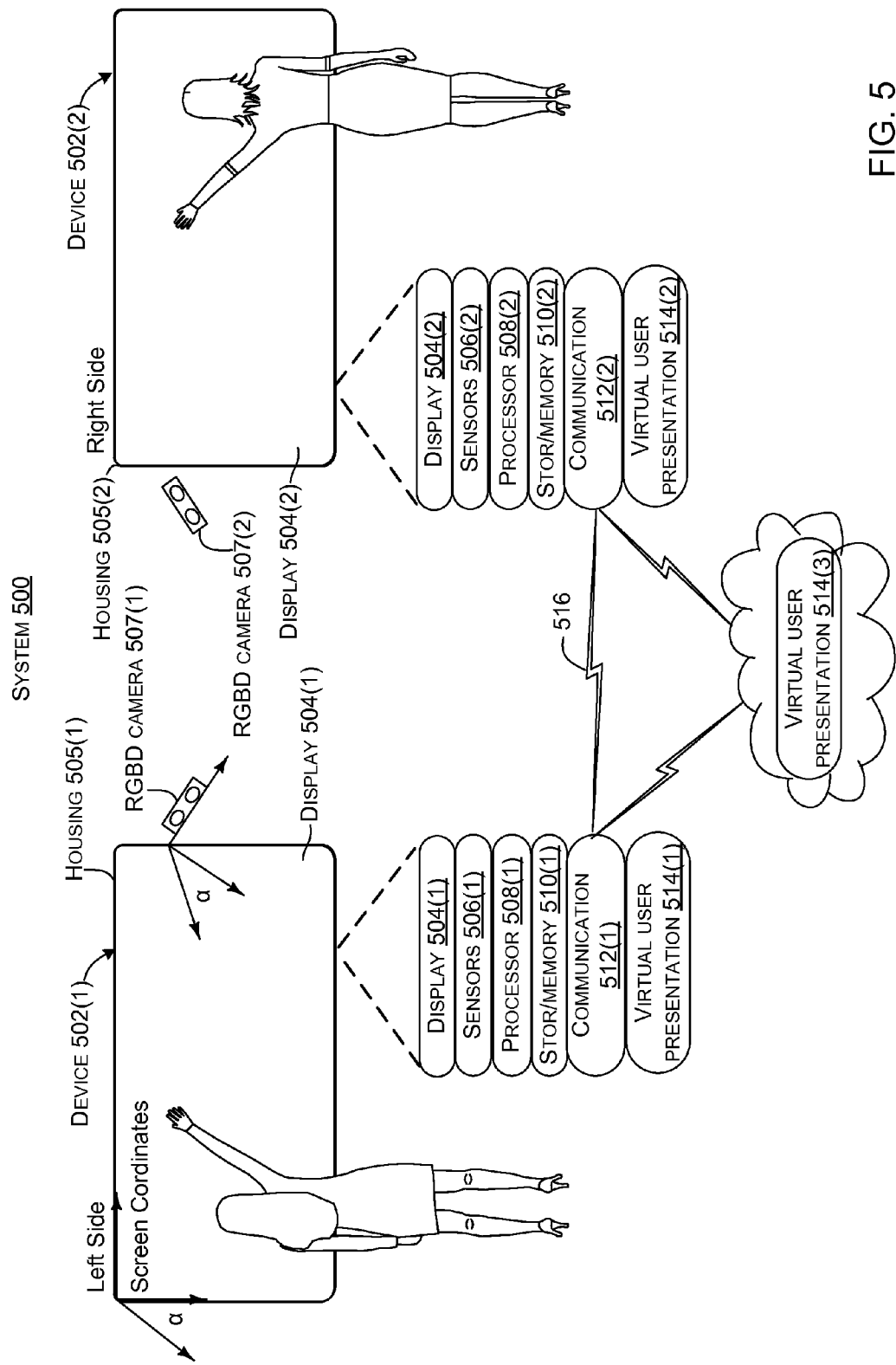
FIGS. 5-7 show example remote collaboration systems in accordance with some implementations of the present concepts.

FIG. 5 shows one ImmerseBoard implementation on a system 500 that is similar to system 100 introduced above. The system illustrates two device configurations manifest as device 502(1) and device 502(2). Both of these devices include a screen or display 504, a housing 505, and sensors 506. Various types of sensors 506 are described below and one type that is described with particularity is a depth camera, commonly referred to as a red, green, blue+depth (RGBD) camera 507. The devices can also include a processor(s) 508, storage/memory 510, communication component 512, and a virtual user presentation component 514. The device 502 can alternatively or additionally include other elements, such as, buses, graphics cards (e.g., graphics processing units (GPUs), network hardware), speakers, etc., which are not illustrated or discussed here for sake of brevity.

In the illustrated configuration, display 504 is a touch sensitive display. However, such need not be the case, additional sensors could be utilized to detect user commands proximate the display to create the impression of a touch display functionality on a non-touch sensitive display. Note further, that the present implementations are not limited to a specific type of display. In contrast, workable implementations can be accomplished with projection displays, light emitting diode (LED) displays, liquid crystal displays, electroluminescent displays, plasma displays, and/or other developing or yet to be developed display types.

The sensors 506 can include various types of sensors including touch sensors, microphones, capacitive sensors, and/or cameras, among others. As mentioned above, some of the sensors can be RGBD cameras 507 or other sensors configured to detect 3-D images (e.g., RGBD images). Various technologies can be utilized for the depth aspect. For example, non-visible spectral patterning can be used, time of flight can be used, and/or stereo cameras can be used, among others. In one implementation, the RGBD cameras 507 can be manifest as Kinect depth cameras offered by Microsoft Corp. or Intel's RealSense 3-D camera, among others. Note also that while only a single set of RGBD cameras 507 is illustrated with each device 502, other implementations could utilize more sets of RGBD cameras 507. For instance, the devices could have a set of RGBD cameras 507 on each side rather than just one side. Alternatively or additionally, the RGBD cameras 507 need not be identical. For instance, a given set of RGBD cameras 507 could contain some near field sensors and some far field sensors or some sensors directed to capture images proximate to the display and some sensors directed to capture images farther from the display (See for instance, FIG. 7). Among other advantages such a configuration could allow improved 3-D mapping of the user. Still another configuration could utilize other sensors pointed at the display, such as on a wall or the ceiling and pointed at the display, to provide further 3-D data (See FIGS. 6-7). Of course, higher resolution sensors can provide more realistic 3-D information and video quality. If resources, such as processing resources and/or network bandwidth are available, higher resolution sensors can contribute to an enhanced user experience. For instance, higher video quality can allow a user to more readily see the visualization of the remote user's eyes.

Note that the RGBD camera 507 can be positioned (or positionable) in a manner so that the RGBD camera captures the display 504. In some cases, the RGBD camera 507 can be mounted in or on housing 505 that protects display 504. In other cases, the RGBD camera 507 could be deployably secured to the housing. For instance, the RGBD camera 507 could be positioned in a hinged bracket that can be stored against the housing (e.g., storage position) and then deployed to a capture position that allows the RGBD camera 507 to capture a region in front of the display. In still other configurations, the RGBD camera 507 can be physically separate from the display (for instance see FIG. 6) and communicate through wired or wireless mechanisms with the display and/or other system elements.

Other sensors 506, such as touch sensors in the display can capture user interactions with the display, such as touching and/or writing (digital writing). The RGBD camera can then be calibrated to the display, so that 3-D points on the display are mapped to 3-D points as captured by the RGBD camera. An example of this calibration is described below relative to FIG. 9. Once calibrated, the digital content of the display 504 can be obtained from the display 504 and the touch sensors 506 and images of the user and depth information can be obtained from the RGBD camera 507. Stated another way, this collection of data (e.g., device environment data) can include stroke data (position and color), color video data, depth video data, and skeleton data, among others. This collection of data (e.g., device environment data) can then be processed for presentation on the other device.

Communication component 512 can facilitate sending and receiving data, such as the device environment data over a network 516. The communication component can be manifest as or work in cooperation with one or more of Ethernet ports, USB ports, HDMI ports, Wi-Fi hardware, and/or cellular hardware, among others.

The virtual user presentation component 514 can use the color and depth data to extract an image and 3-D point cloud of the user without the background, while the skeleton data can allow the virtual user presentation component 514 to track the positions of the limbs of the user. (This aspect is illustrated relative to FIG. 9). The depth data and skeleton data can be expressed in the coordinate system of the capturing sensor (e.g., RGBD camera 507). In order to understand the pose of the user in relation to the display, the sending virtual user presentation component 514 can transform the data from the sensor's coordinate system into the display's coordinate system. In some implementations, this can entail prior calibration of the pose of the sensor with respect to the display. An example calibration technique is described below relative to FIG. 8. Briefly, note from FIG. 5 that sensors (e.g., RGB camera 507(1)) are positioned to the side of display 504(1) and can be angled slightly toward the display to capture a region directly in front of the display. As such, the calibration can serve to map 3-D points in space, such as those at various positions on the display to the corresponding points from the perspective of the sensor. The calibration can then be utilized to correlate other 3-D points between the display 504(1) and the sensor 506(1).

The virtual user presentation component 514 can utilize signals from the various sensors to create the ImmerseBoard experience. As mentioned above, in order to utilize various signals, the virtual user presentation component 514 can calibrate the signals to one another. This calibration aspect can allow greater design flexibility than was previously possible. For instance, in previous solutions, a camera tended to be mounted behind the display (e.g., on the opposite side from the user). The camera captured images of the user through the display. In contrast, the present concepts do not require imaging through the display. Instead, the sensors (e.g., cameras) can be positioned in the plane of the display and/or on the same side of the plane as the user. The virtual user presentation component 514 can calibrate the display and the sensors relative to 3-D coordinates to allow meaningful use of the various data. An example of how the virtual user presentation component can calibrate signals from the various sensors is described below relative to FIG. 8.

Further, previous technologies tended to simply display captured video from the local device on the remote device and vice versa. In contrast, the virtual user presentation component 514 can process the video to provide various visualization scenarios that more accurately mimic face-to-face interactions. Examples are illustrated relative to FIGS. 1-4 above. For instance, the virtual user presentation component 514 can perform video processing to separate the user's image from the background and allow the screen tilt and arm 'stretch' features described above.

The video processing can be explained beginning with a standard video condition, in which the left or right side of the display 504 is reserved for standard 2-D video, leaving the bulk of the display area as a shared writing surface. For purposes of explanation, device 502(1) can be referred to as 'left' since the display 504(1) is to the left of the sensor (e.g., RGBD camera 507(1)). Device 502(2) can be referred to as 'right' since the display 504(2) is to the right of the sensor 506(2).

The video can be captured by sensors 506 in the form of a color camera in the respective sensor 506 (e.g. RGBD camera 507), and displayed on the same side of the device 502 as the camera, so that the eye gaze discrepancy a is about 15 degrees, for example. The display 504 can be large enough to show the upper body of the remote user, life-sized.

The virtual user presentation component 514 can process the video so that the background is removed and the user is framed properly regardless of where he/she is standing. For instance, the sensor(s) 506, such as RGBD camera 507 can capture both the user and the background, but the background portions tend not to be useful. Actually, the background portions are often distracting since remote rooms usually do not tend to have the same environment. Some of the present implementations can perform foreground-background segmentation and only send the user's image to the remote side (e.g., to the other user).

Various system configurations can be employed. For instance, in a situation where local and remote resources are relatively similar, each virtual user presentation component 514 can calibrate the digital content from its respective display 504 and RGBD camera 507. The virtual user presentation component 514 can separate out data relating to the user from background image data. The virtual user presentation component 514 can send the user image data and correlated changes to the content of the display to the other virtual user presentation component 514. In other configurations, an individual virtual user presentation component 514 may be resource constrained and may send unprocessed display content and RGBD image data for processing at the other virtual user presentation component 514. Still other implementations may utilize server-based (e.g., cloud-based resources) to perform some or all of the processing. For instance, virtual user presentation component 514(1) may send display content from display 504(1), image data from RGBD camera 507(1), audio data from sensors 506(1), and calibration data to virtual user presentation component 514(3). Similarly, virtual user presentation component 514(2) may send its display content from display 504(2), image data from RGBD camera 507(2), audio data from sensors 506(2), and calibration data to virtual user presentation component 514(3). The virtual user presentation component 514(3) may process the data from virtual user presentation component 514(1) and send it for presentation on device 502(2). The virtual user presentation component 514(3) may process the data from virtual user presentation component 514(2) and send it for presentation on device 502(1). Of course, processing can also be distributed over various devices based upon processing resources, storage resources, and/or network bandwidth resources. For example, an individual device may be resource constrained but may perform initial processing to decrease network bandwidth usage which might otherwise be insufficient to maintain a quality ImmerseBoard experience. Thus, the present implementations can entail information about the displayed content, visual images of the user, calibration information and audio information. This information can be processed at one or more locations by one or more devices to accomplish an ImmerseBoard experience.

In some implementations, multiple devices at a given location may function cooperatively to provide an ImmerseBoard experience. For instance, a smartphone might have a microphone, speakers, and an RGBD camera. The smartphone could be placed in a bracket associated with a touch sensitive display. The smartphone's RGBD camera could be calibrated to the touch sensitive display (see FIG. 8). The smartphone could then capture audio and video data while the touch sensitive display captures displayed content data. This data can be processed for presentation on a remote ImmerseBoard environment while data from the remote ImmerseBoard environment is received and displayed on the touch sensitive display and emitted from the speaker of the smart phone.

From one perspective, devices 502 can be thought of as computers. Processor 508 can execute data in the form of computer-readable instructions to provide a functionality. Data, such as computer-readable instructions and/or user-related data, can be stored on storage 510, such as storage that can be internal or external to the computer. The storage can include any one or more of volatile or non-volatile memory, hard drives, flash storage devices, and/or optical storage devices (e.g., CDs, DVDs etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some configurations, devices 502 can include a system on a chip (SOC) type design. In such a case, functionality provided by the computer can be integrated on a single SOC or multiple coupled SOCs. One or more processors can be configured to coordinate with shared resources, such as memory, storage, etc., and/or one or more dedicated resources, such as hardware blocks configured to perform certain specific functionality. Thus, the term "processor" as used herein can also refer to central processing units (CPUs), graphical processing units (CPUs), controllers, microcontrollers, processor cores, or other types of processing devices suitable for implementation both in conventional computing architectures as well as SOC designs.

Examples of other computers can include traditional computing devices, such as personal computers, desktop computers, notebook computers, cell phones, smart phones, personal digital assistants, pad or tablet type computers, cameras, large display devices, projection devices, interactive digital displays and/or any of a myriad of ever-evolving or yet to be developed types of computing devices. In some cases, the display device can include computer elements, and thus be thought of as a computer. In other cases, the display device can communicate with and be controlled by a computer. Note that the above grouping is for example purposes only, is not intended to be limiting, and can include overlap. For instance, smart phones and tablet type computers can also be described as interactive digital displays since they tend to have touch screens.

Figure 6:
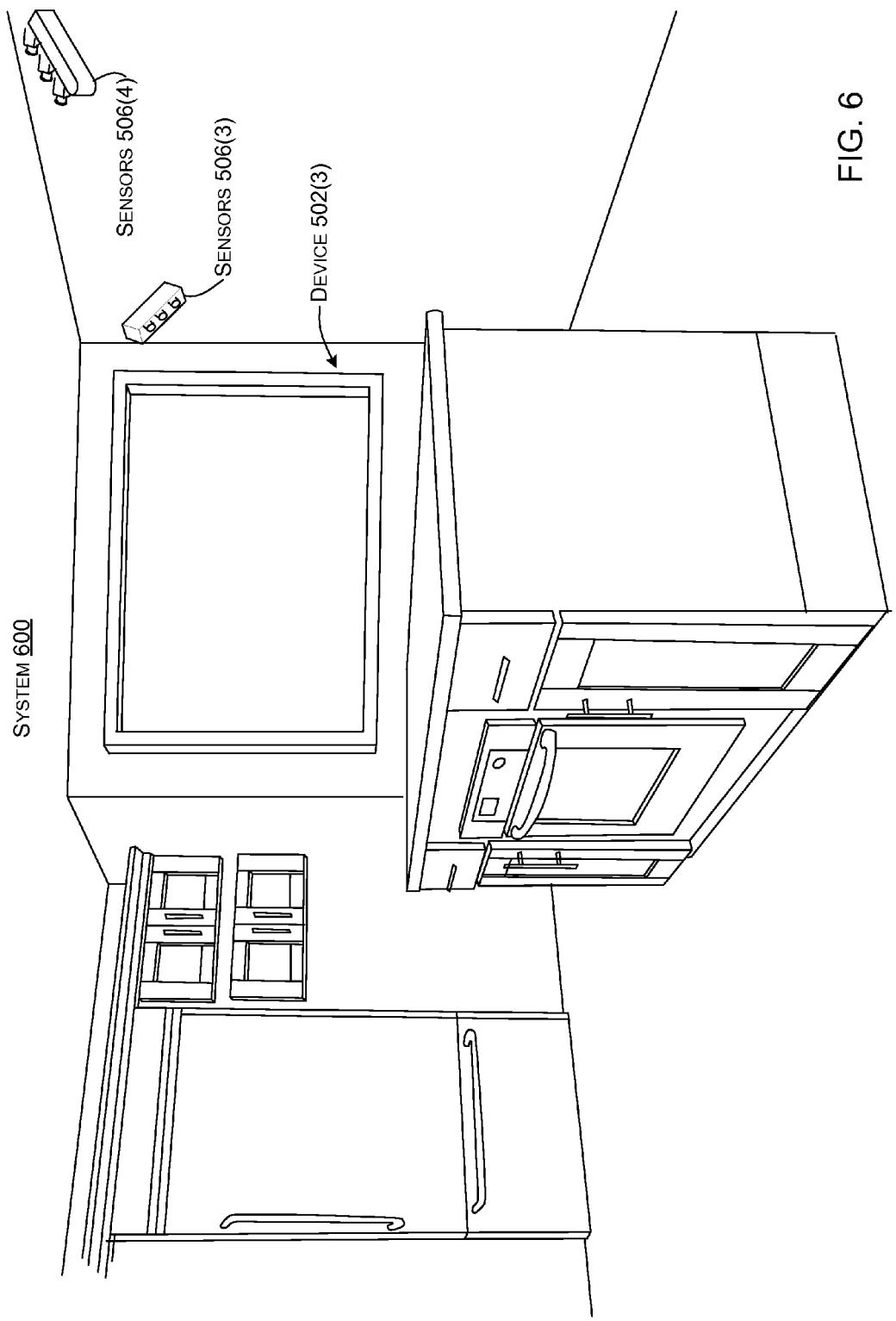

FIGS. 6-7 illustrate additional ImmerseBoard systems. FIG. 6 shows a system 600 employed in a home kitchen environment. In this case, system 600 entails device 502(3) and two sets of sensors 506(3) and 506(4). The device can communicate with a remote device (not shown) to create an ImmerseBoard experience.

FIG. 7 shows another system 700. In this system configuration, device 502(4) simply functions as a touch sensitive display. A computing device 702 can be communicatively coupled to device 502(4) and sensors 506(5)-506(8). The virtual user presentation component (FIG. 5) can be manifest on the computing device 702. In contrast, device 502(5) is manifest as a mobile device, in this case a tablet-type mobile device. In this implementation, the mobile device can have multiple sets of sensors 506. Two sets of sensors 506(9) and 506(10) can represent two sets of RGBD cameras. In this example, the first set of RGBD cameras can be oriented generally parallel to the touch sensitive display to capture user actions proximate to the display. The second set of sensors can be oriented to capture a region in front of the display (e.g., a region where a head and/or torso of user 704 is likely to be located when using the device). The computing device 702 can process signals from sensors 506(5)-506(8) and/or from device 502(5) to generate an ImmerseBoard experience that is presented as a graphical user interface (GUI) 706(1) on device 502(4). Similarly, device 502(5) can process signals from sensors 506(9)-506(10) and/or from device 502(6) to generate an ImmerseBoard experience that is presented as a graphical user interface (GUI) 706(2) on device 502(5).

Calibration Condition

Figure 8:
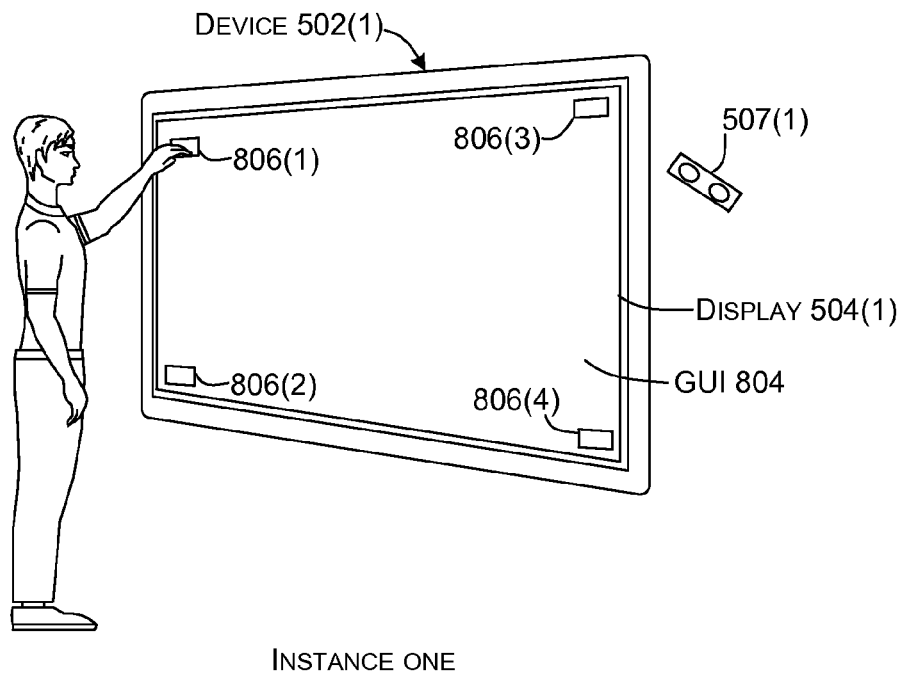
FIG. 8 shows an example calibration process in accordance with some implementations of the present concepts.
Figure 8:
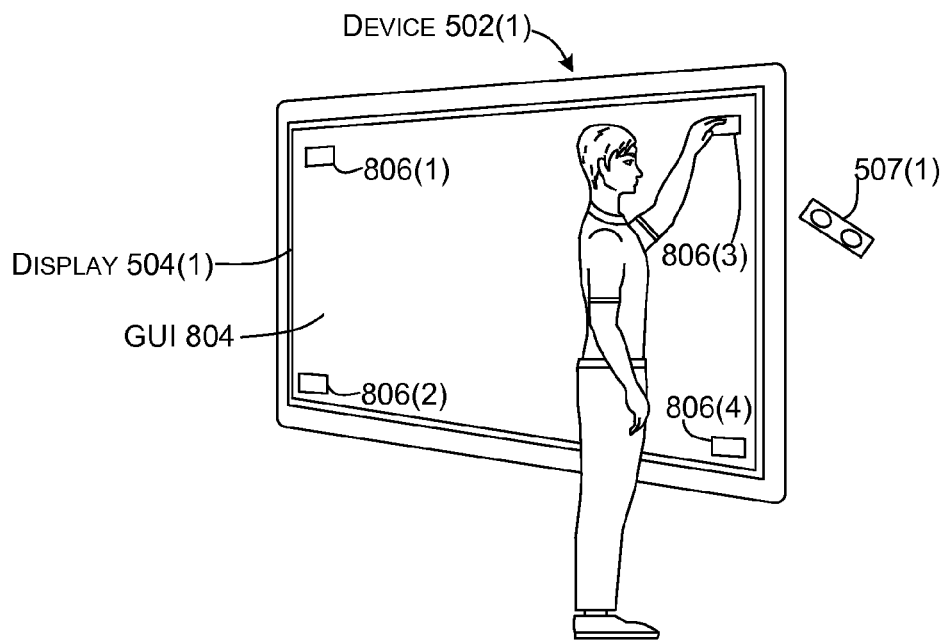

FIG. 8 shows a technique for calibrating device 502(1). In this case, the virtual user presentation component 514(1) (FIG. 5) can cause a GUI 804 to be generated that can calibrate signals from multiple sensors; in this case touch sensors (not shown) of the display 504(1) and RGBD camera 507(1).

The GUI 804 can include multiple points (in this case four points 806(1)-806(4)) and instructions for the user to touch the four points sequentially. Instance one shows the user touching point 806(1) and Instance two shows the user touching point 806(3). When the user taps a point, the virtual user presentation component 514(1) can record his 3-D hand position from the skeleton information. From these four 3-D positions, the virtual user presentation component 514(1) can calculate a transformation matrix relating the coordinate systems of the camera and the board. Of course, the number of points and their relative location on the display are illustrative only and other configurations are contemplated to facilitate 3-D calibration between the display and the sensors. State another way, when the user touches the points, the virtual user presentation component 514(1) receives simultaneous information from touch sensors of the display 504(1) and RGBD data of the user from the RGBD camera 507(1). From this information, the virtual user presentation component 514(1) can calibrate the region captured by the RGBD camera to the display.

Note that the calibration may be a one-time event or could be a re-occuring event. For instance, in reference to FIG. 5, the device 502(1) may include both the display 504(1) and the sensors 506(1) at the time of manufacture. In a configuration where the orientation of the sensors is permanently fixed relative to the display, the calibration may be performed by the manufacturer. In one such implementation, the sensors may be built into or onto a device housing that also contains the display and as such their relative orientation is permanently fixed. In other configurations, the position and/or orientation of the sensors relative to the display may be adjustable. As such, calibration can be performed after set-up of the device, such as by an installer, IT person, and/or end user. In still other configurations, one or more elements may be purchased and communicatively coupled to allow an ImmerseBoard implementation to be achieved. For instance, the user may have a digital white board and may buy the sensors and associated ImmerseBoard computer readable instructions. The user could communicatively couple the sensors and the digital white board, physically orient the sensors relative to the digital whiteboard and install the ImmerseBoard computer readable instructions on the digital white board or another device (see for instance FIG. 7) and then calibrate the sensors to the digital white board. Recalibration can be employed in instances where the sensors get bumped or some other use case scenario.

Once the sensor's RGBD data are transformed into the display's coordinate system, it can be processed and rendered with different visualizations. Some implementations can use $C_{++}$ and OpenGL for 2-D/3-D video processing and rendering.

Immerseboard Conditions

The following discussion explains the illustrated ImmerseBoard configurations of FIGS. 1-4 in light of system components introduced relative to FIG. 5. The discussion also references FIGS. 8-13, which illustrate specific aspects in more detail. As such, the following description may reference back and forth between FIGS. 1-5 and 8-13.

Hybrid Condition

The hybrid condition illustrated in FIGS. 1-2 is a hybrid of a video condition and a 3-D experience. In the hybrid condition, the remote user's hand is able to reach out of the video window (e.g., virtual user display portion 116) to gesture, point, or touch the display when writing on the interactive portion 118 as shown in FIG. 2. From the remote user's hand position, the local user is often able to understand the remote user's intention as well as his attention (e.g., where he is looking).

Figure 9:
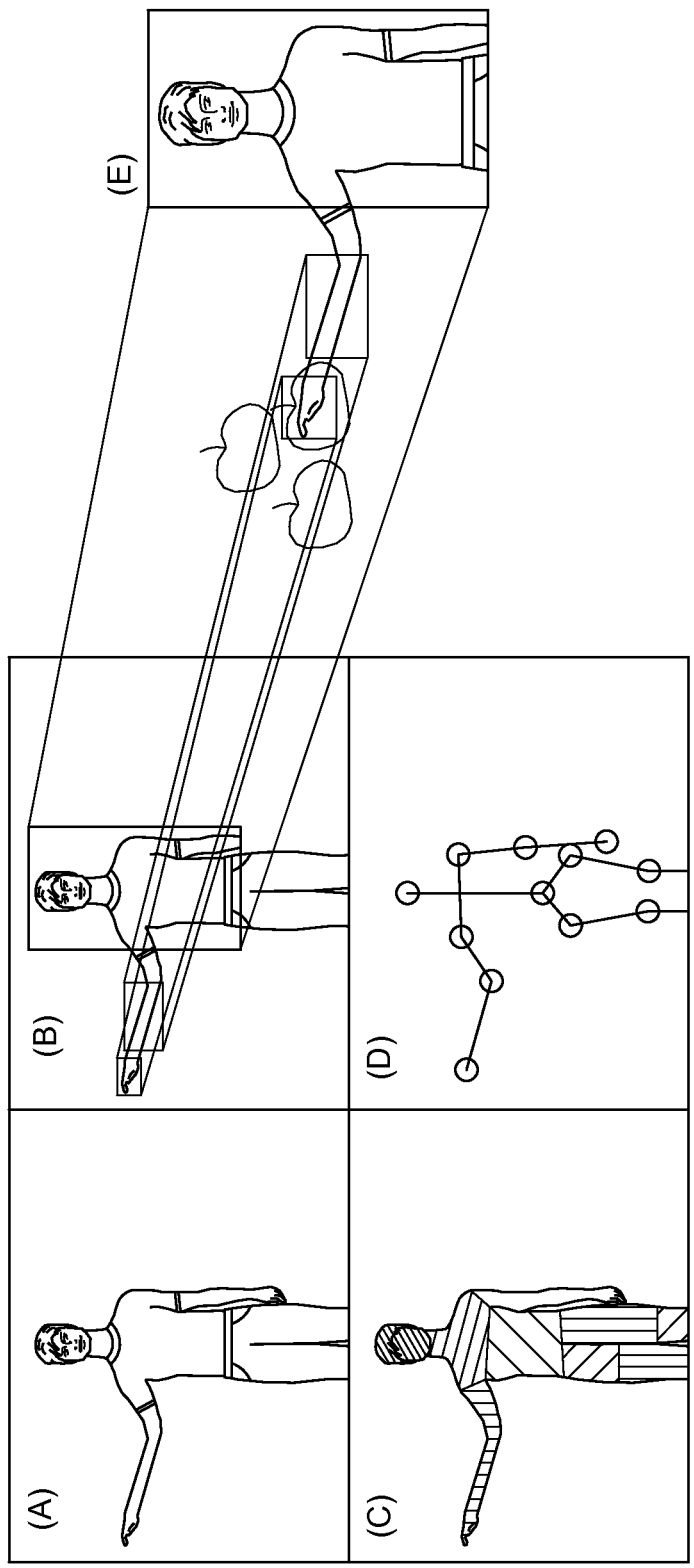
FIGS. 9-13 show additional detail about remote visualization aspects of some of the scenarios of FIGS. 1-4 in accordance with some implementations of the present concepts.

The virtual user presentation component 514 (FIG. 5) can implement the hybrid condition using 3-D depth and skeleton information from the sensors 506 (FIG. 5) to guide 2-D color video processing, as shown in FIG. 9. This FIG. shows video processing in the hybrid condition. Specifically, in accordance with some implementations (A) shows source RGB image, (B) shows an extracted human image, (C) shows a segmentation result, (D) shows a skeleton, and (E) shows the rendering result.

The sensors 506 and/or 507 (FIG. 5) can determine foreground (e.g., user) and background pixels. Each foreground pixel can have a 3-D coordinate. The virtual user presentation component 514 (FIG. 5) can use these 3-D coordinates to segment pixels into body parts according to the pixels' 3-D proximity to bones in the skeleton. The foreground pixels can be framed within the video window of the display such that the upper body pixels are displayed. (This is the same as in the video condition.) For the reaching or stretched arm 120 and 202 of FIGS. 1 and 2, respectively, the virtual user presentation component 514 (FIG. 5) can extract arm and hand pixels from the 2-D image, and move the hand pixels to the appropriate location on the device 502 (FIG. 5). The virtual user presentation component 514 can stretch the image of the arm to seamlessly connect the upper body in the virtual user display portion 116 to the hand in the interactive portion 118 using texture mapping and deformation as illustrated in FIGS. 1-2.

Aside from the stretched arm, the foreground image can be identical to that coming from the RGB data of the RGBD camera. Thus, image quality and eye gaze discrepancy can be the same as in the video condition.

FIG. 10 shows an example of how ImmerseBoard can implement the mirror condition by transforming the 3-D colored point cloud from the sensor coordinate system (e.g., coordinate system of the RGBD camera) to the device coordinate system (e.g., display area coordinate system), and then flipping the z-axis (z to −z). The remote user's point cloud can be rendered using a 3-D polygonal mesh. The viewpoint from which the remote user is rendered onto the display can either be fixed at a default position, or for (potentially) maximum accuracy, can track the head of the observer.

Figure 11:
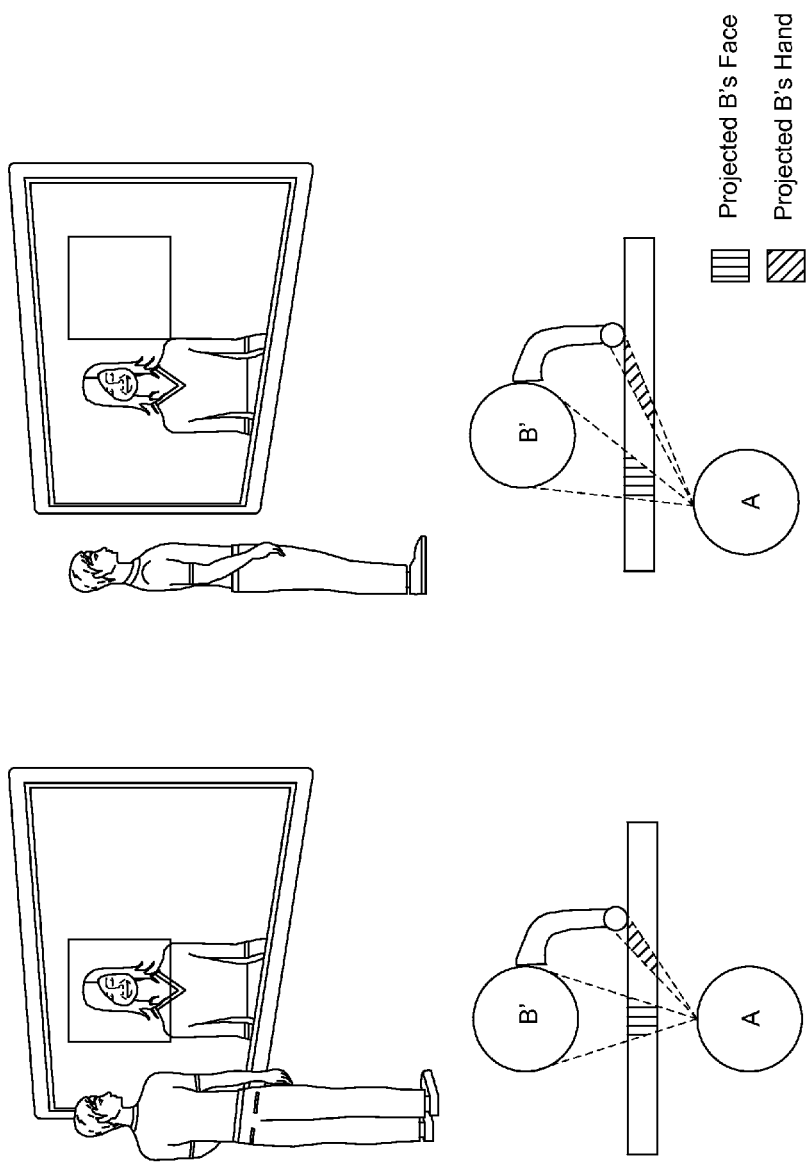

When head tracking is used at both sides, the relative geometry between the users can be precise, and eye contact is possible if the video quality is sufficiently high. Moreover, head tracking can allow either user to move to look around either of the figures on the board or around the remote user, as shown in FIG. 11. However, in some implementations, the side of the remote user not seen by his sensors cannot be rendered, leading to a significant loss of perceived visual quality. Some implementations can employ a second sensor on the other side of the device to solve the problem. (See for instance, FIG. 7)

Gaze Correction

Figure 12:
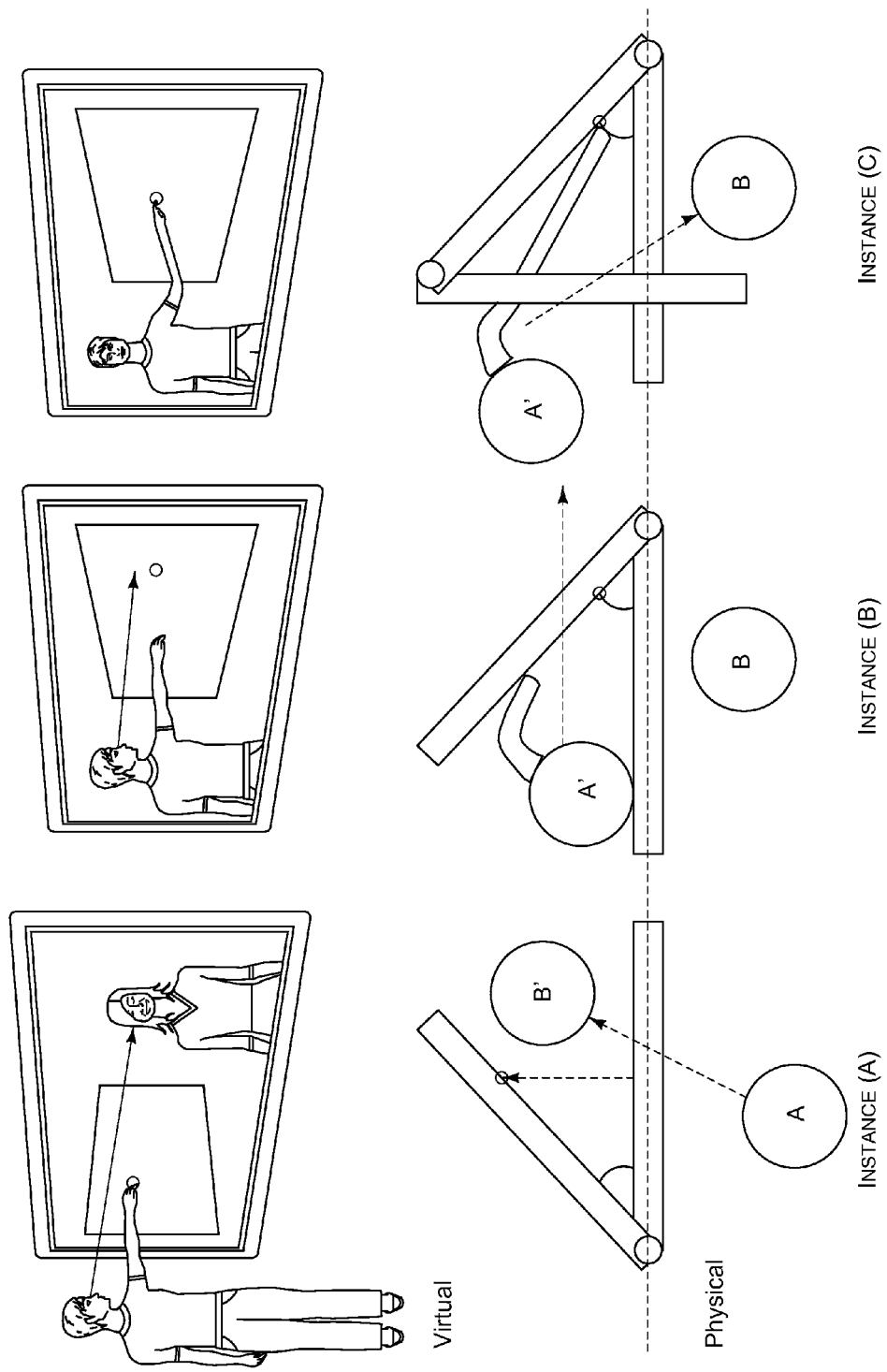
Figure 13:
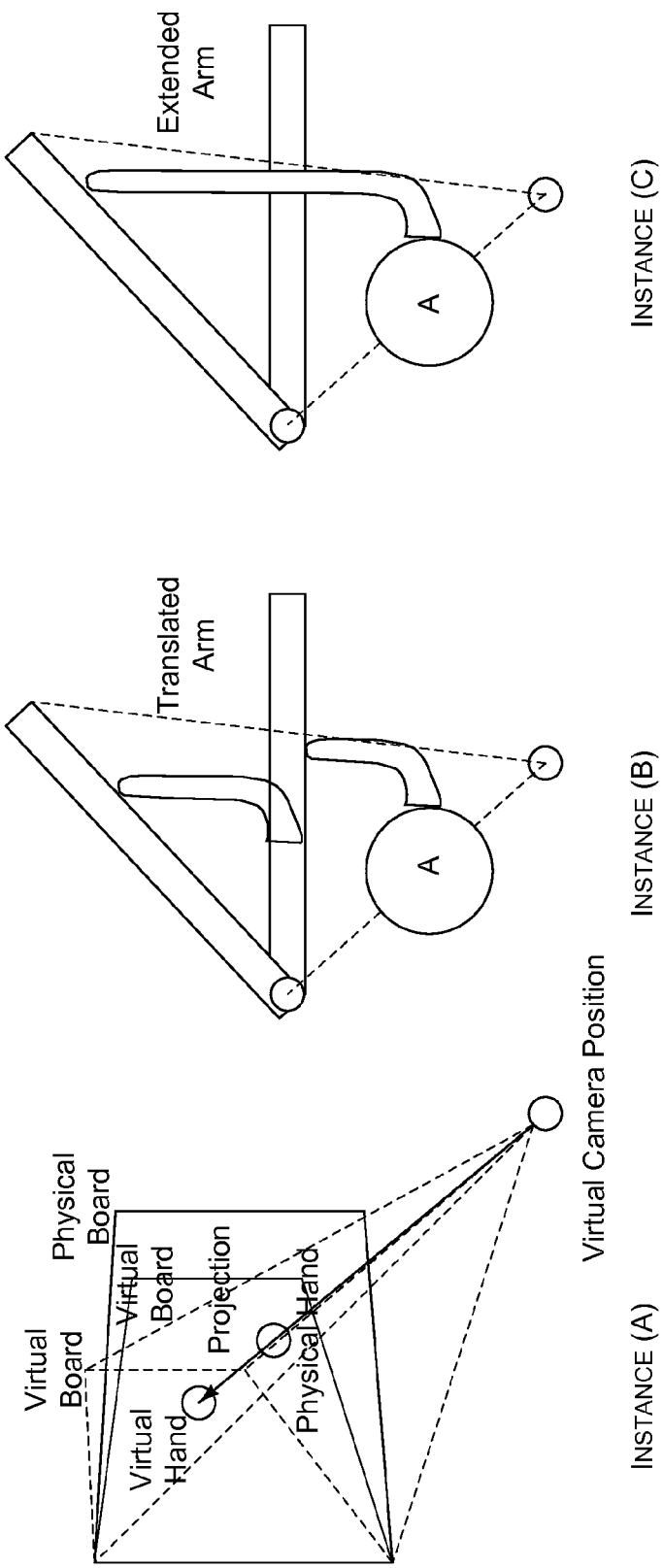

In some implementations, the virtual user presentation component 514 (FIG. 5) can reduce the gaze divergence between the users. For instance, relative to FIG. 3, the remote user's image can be placed as close as possible to the sensor 506/507 (FIG. 5). Thus, the direction of the tilt can be different for the left and right boards, as shown in FIG. 12 instances (A) and (B), respectively. For the left board, the sensor can be located on the right, and the virtual board is tilted to the left (Instance (A)). For the right board, the RGBD camera can be located on the left, and the virtual board is tilted to the right (Instance (B)). As a byproduct, this can increase the overlap of the remote user seen by the local user and captured by the remote sensor (e.g., RGBD camera), potentially resulting in higher image quality, compared to the mirror condition.

However, when the remote user writes on a tilted board, he/she is actually writing on the image of the tilted virtual surface projected onto the physical surface of the device. Therefore, if the virtual user presentation component 514 directly reconstructs the physical environment as with the mirror condition and changes only the viewpoint, the remote user potentially points at the wrong place, and looks at the corner of the board in the virtual environment as shown in FIG. 12 instance (B). FIG. 12 instance (C) shows how the correct touch point and eye direction can be realized. The virtual user presentation component 514 can rotate the captured person 45 degrees around the virtual board's corner, thus correcting the remote user's eye direction in the virtual environment. In addition, the system can extend the remote user's arm to reach the correct position in the virtual environment.

To extend the remote user's arm, the virtual user presentation component 514 can calculate an appropriate hand position in the virtual environment. For example, if the user is touching the physical board, this corresponds to a position on the virtual board (FIG. 13 instance (A)). The hand is moved to this position in the virtual environment. However, if only the hand is moved to this position, it would be disconnected from the body (FIG. 13 at instance (B)). Thus, the virtual user presentation component 514 can use a coefficient $\alpha$ to interpolate the positions for points on the hand ($\alpha=1.0$), arm ($0.0<\alpha<1.0$) and shoulder ($\alpha=0.0$). The virtual user presentation component 514 can also use a coefficient $\beta$, based on the hand skeleton position in the device coordinate system, to perform the interpolation only near the board. The virtual user presentation component 514 can have two thresholds: min(=10 cm) and max(=20 cm). If the user's hand is closer than min, $\beta$ is 1.0. If it is further than max, $\beta$ is 0.0. Otherwise, $\beta$ is determined linearly ($0<\beta<1.0$). The virtual user presentation component 514 can transform each point on the hand, arm, or shoulder to a point $$P_t = P_h(1-\alpha\beta) + P_p(\alpha\beta), \quad (1)$$

where $P_h$ is the original point and $P_p$ is the projected point.

Color Palette

The virtual user presentation component 514 can provide a color palette with drawing colors and an eraser. In some implementations, three types of color pallet menus are supported: fixed, side-slide, and pop-up. In some implementations, the fixed color palette is on the bottom of the screen. The side-slide can appear when the user's hand is close to the left or right side of the display. The pop-up color palette can be triggered by the non-dominant hand when it stays close to the board.

Note that for ease of explanation, the three conditions are explained separately. However, some implementations can utilize all three conditions and automatically select (or allow the user to select) which condition to utilized in a given user scenario.

Method Examples

Figure 14:
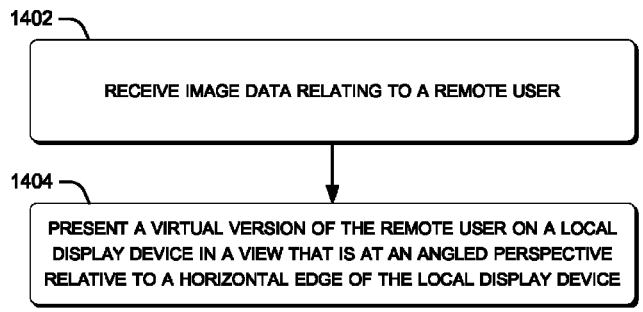
FIGS. 14-15 show flowchart examples of remote visualization techniques in accordance with some implementations of the present concepts.

FIG. 14 shows an example method 1400.

In this case, the method can receive image data relating to a remote user at block 1402.

The method can present a virtual version of the remote user on a local display device in a view that is at an angled perspective relative to a horizontal edge of the local display device at block 1404. One such example is illustrated relative to FIG. 3.

Figure 15:
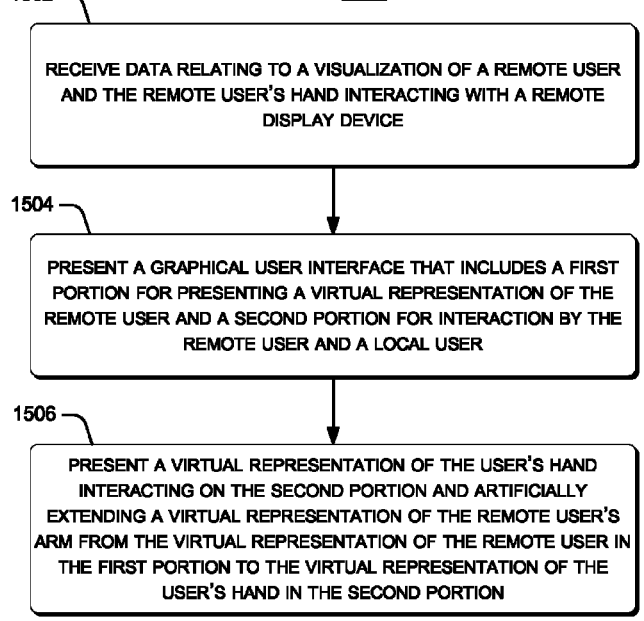

FIG. 15 shows another example method 1500.

In this case, the method can receive data relating to a visualization of a remote user and the remote user's hand interacting with a remote display device at block 1502.

The method can present a graphical user interface that includes a first portion for presenting a virtual representation of the remote user and a second portion for interaction by the remote user and a local user at block 1504.

The method can present a virtual representation of the user's hand interacting on the second portion and artificially extending a virtual representation of the remote user's arm from the virtual representation of the remote user in the first portion to the virtual representation of the user's hand in the second portion at block 1506. An example manifestation of method 1500 is evidenced in FIGS. 1-2.

The described methods can be performed by the systems and/or devices described above relative to FIGS. 1-8, and/or by other devices and/or systems. The order in which the methods are described is not intended to be construed as a limitation, and any number of the described acts can be combined in any order to implement the method, or an alternate method. Furthermore, the method can be implemented in any suitable hardware, software, firmware, or combination thereof, such that a device can implement the method. In one case, the method is stored on computer-readable storage media as a set of instructions such that execution by a computing device causes the computing device to perform the method.

The invention claimed is:

1. A system, comprising:
   a touch sensitive display;
   a processor; and
   storage having computer-readable instructions which, when executed by the processor, cause the processor to:
   obtain video of a local user from a camera that is configured to capture the local user in a region in front of the touch sensitive display;
   render a tilted view of a local drawing surface on a graphical user interface (GUI) on the touch sensitive display, the tilted view showing the local drawing surface as tilted at an angle away from the local user;
   temporarily rectify the local drawing surface to provide a rectified view and receive inputs from the local user while the local drawing surface is shown in the rectified view;

after the inputs are received, show a modified local drawing surface in the tilted view, the modified local drawing surface reflecting the inputs received from the local user;

send display content reflecting the video of the local user and the modified local drawing surface to a remote device;

receive other display content from the remote device reflecting interaction by a remote user with the remote device; and using the other display content, update the GUI to include a virtual representation of the remote user of the remote device interacting with the modified local drawing surface.

2. The system of claim 1, wherein the computer-readable instructions, when executed by the processor, cause the processor to:

cause the video of the local user to be captured;

separate a portion of the video containing the local user from background portions of the video; and include the portion of the video containing the local user in the display content sent to the remote device.

3. The system of claim 1, wherein the system includes the remote device.

4. The system of claim 1, embodied as a single computing device comprising the touch sensitive display, the processor, and the storage.

5. The system of claim 1, further comprising the camera, wherein the camera is a red, green, blue, +depth (RGBD) camera positionable to capture the region in front of the touch sensitive display.

6. The system of claim 5, wherein the RGBD camera is fixedly mounted to the touch sensitive display.

7. The system of claim 1, wherein the GUI comprises a first portion configured to present the virtual representation of the remote user and another portion configured to present the local drawing surface.

8. The system of claim 1, wherein the computer-readable instructions, when executed by the processor, cause the processor to:

detect that the local user has moved a hand close to the touch sensitive display; and temporarily rectify the local drawing surface responsive to detecting that the local user has moved the hand close to the touch sensitive display.

9. The system of claim 8, wherein the computer-readable instructions, when executed by the processor, cause the processor to:

after the local drawing surface has been rectified, detect that the local user has withdrawn their hand away from the touch sensitive display; and return the local drawing surface to the tilted view responsive to detecting that the local user has withdrawn their hand away from the touch sensitive display.

10. The system of claim 1, wherein the local drawing surface is a rectangle that is shown as tilted between 10 and 45 degrees away from the local user.

11. A system, comprising:

a processor;

a touch sensitive display; and storage having computer-executable instructions which, when executed by the processor, cause the processor to:

obtain red, green, blue, plus depth (RGBD) data from an RGBD camera oriented to sense a local user in a region in front of the touch sensitive display;

render a tilted view of a local drawing surface on the touch sensitive display, the local drawing surface being tilted at an angle away from the local user when shown in the tilted view;

detect user input to the touch sensitive display and, in response, rectify the local drawing surface to provide a rectified view that is in line with the touch sensitive display;

update the local drawing surface displayed on the touch sensitive display to reflect changes by the local user via the user input;

return the local drawing surface to the tilted view; and transmit the changes made by the local user to a remote system.

12. The system of claim 11, further comprising the RGBD camera.

13. The system of claim 12, wherein the RGBD camera is at an orientation that is neither horizontal nor vertical relative to the touch sensitive display.

14. The system of claim 12, wherein the RGBD camera comprises a first RGBD camera that is oriented generally parallel to a plane defined by the touch sensitive display and a second RGBD camera that is oriented to capture the region in front of the plane and wherein the first and second RGBD cameras and the touch sensitive display are mounted in a housing.

15. The system of claim 14, manifest as a mobile device or a device that is configured to be mounted on a vertical wall.

16. The system of claim 11, wherein the computer-executable instructions, when executed by the processor, cause the processor to:

separate a first portion of the RGBD data relating to the local user in the region from a second portion of background data; and transmit the first portion without the second portion to the remote system.

17. A method comprising:

obtaining video data from a camera oriented to sense a local user in a region in front of a local touch sensitive display;

presenting a tilted view of a local drawing surface on the local touch sensitive display, the local drawing surface being tilted at an angle away from the local user when shown in the tilted view;

detecting user input by the local user to the local touch sensitive display and, in response, rectifying the local drawing surface to provide a rectified view that shows the local drawing surface in line with the local touch sensitive display;

updating the local drawing surface presented on the local touch sensitive display to reflect changes by the local user on the local touch sensitive display via the user input;

returning the local drawing surface to the tilted view; and transmitting the changes by the local user to a remote display.

18. The method of claim 17, wherein the local drawing surface is a rectangle that is shown as tilted between 10 and 45 degrees away from the local user when shown in the tilted view.

19. The method of claim 17, wherein the video data comprises depth data.

20. The method of claim 17, performed by a server connected via a network to both the local touch sensitive display and the remote display.

\* \* \* \* \*